US009651991B2

United States Patent
Kim et al.

(10) Patent No.: US 9,651,991 B2
(45) Date of Patent: May 16, 2017

(54) MOBILE TERMINAL AND CONTROL METHOD THEREOF

(71) Applicant: LG ELECTRONICS INC., Seoul (KR)

(72) Inventors: Sujin Kim, Seoul (KR); Jiyoung Park, Seoul (KR); Jumin Chi, Seoul (KR); Sunghye Yoon, Seoul (KR)

(73) Assignee: LG ELECTRONICS INC., Seoul (KR)

(*) Notice: Subject to any disclaimer, the term of this patent is extended or adjusted under 35 U.S.C. 154(b) by 0 days.

(21) Appl. No.: 14/280,449

(22) Filed: May 16, 2014

(65) Prior Publication Data

US 2014/0347295 A1  Nov. 27, 2014

(30) Foreign Application Priority Data

May 22, 2013 (KR) .................. 10-2013-0057889

(51) Int. Cl.
- G06F 3/041 (2006.01)
- G06F 1/16 (2006.01)
- G06F 3/01 (2006.01)
- G06F 3/0488 (2013.01)

(52) U.S. Cl.
CPC ............ *G06F 1/163* (2013.01); *G06F 1/1639* (2013.01); *G06F 1/1643* (2013.01); *G06F 1/1647* (2013.01); *G06F 3/017* (2013.01); *G06F 3/041* (2013.01); *G06F 3/04883* (2013.01)

(58) Field of Classification Search
CPC combination set(s) only.
See application file for complete search history.

(56) References Cited

U.S. PATENT DOCUMENTS

| | | | | |
|---|---|---|---|---|
| 2010/0099457 | A1* | 4/2010 | Kim ................. | G03B 21/14 455/556.1 |
| 2011/0134074 | A1* | 6/2011 | Norieda ............ | G06F 1/163 345/174 |
| 2011/0151926 | A1* | 6/2011 | Kim ................. | H04N 5/74 455/556.1 |
| 2011/0154249 | A1* | 6/2011 | Jang ................. | G06F 3/017 715/781 |
| 2012/0098754 | A1* | 4/2012 | Kim ................. | H04N 1/0035 345/173 |
| 2012/0249409 | A1* | 10/2012 | Toney ............... | G06F 3/017 345/156 |
| 2014/0068494 | A1* | 3/2014 | Petersen ........... | H04M 1/7253 715/778 |

* cited by examiner

*Primary Examiner* — Jonathan Boyd
*Assistant Examiner* — Sosina Abebe
(74) *Attorney, Agent, or Firm* — Ked & Associates, LLP

(57) ABSTRACT

A mobile terminal and a control method are provided. The mobile terminal includes: a body formed to wrap around at least one region of a wrist; a projection unit disposed to the side of the body and projecting image information; a display unit disposed on a front surface of the body and configured to output first screen information; and a controller configured to control the projection unit to project screen information corresponding to first screen information currently displayed on the display unit, on the basis of a pre-set type touch applied to the display unit.

11 Claims, 31 Drawing Sheets

(a)

(b)

(a)

(b)

(a)

(b)

MOBILE TERMINAL AND CONTROL METHOD THEREOF

CROSS REFERENCE TO RELATED APPLICATIONS

Pursuant to 35 U.S.C. §119(a), this application claims the benefit of earlier filing date and right of priority to Korean Application No. 10-2013-0057889, filed on May 22, 2013, the contents of which is incorporated by reference herein in its entirety.

BACKGROUND OF THE INVENTION

Field of the Invention

The present invention relates to a mobile terminal and, more particularly, to a mobile terminal that may be put on a user's wrist in a wrapping manner, and a control method thereof.

Description of the Related Art

In general, terminals may be divided into a mobile terminal and stationary terminal according to whether or not terminals are movable. In addition, mobile terminals may be divided into a handheld terminal and a vehicle mount terminal according to whether or not users can directly carry it around.

As such functions become more diversified, the mobile terminal can support more complicated functions such as capturing images or video, reproducing music or video files, playing games, receiving broadcast signals, and the like. By comprehensively and collectively implementing such functions, the mobile terminal may be embodied in the form of a multimedia player or device. Efforts are ongoing to support and increase the functionality of mobile terminals. Such efforts include software and hardware improvements, as well as changes and improvements in the structural components which form the mobile terminal.

On the strength of such an improvement, terminals are evolving toward having various designs, and due to due to the characteristics that they are lightweight and not brittle, flexible displays have come to prominence. Flexible displays may create new user interface areas which are limited or impossible with existing glass substrate-based displays. Thus, as flexible displays have come to prominence, demands for user interfaces using the characteristics of flexible displays have emerged.

SUMMARY OF THE INVENTION

An aspect of the present invention is to provide a mobile terminal capable of enhancing user convenience in displaying screen information on a display unit of a mobile terminal that wraps around a user's wrist, and a control method thereof.

According to an embodiment of the present invention, there is provided a mobile terminal including: a body formed to wrap around at least one region of a wrist; a projection unit disposed to the side of the body and projecting image information; a display unit disposed on a front surface of the body and configured to output first screen information; and a controller configured to control the projection unit to project screen information corresponding to first screen information currently displayed on the display unit, on the basis of a pre-set type touch applied to the display unit.

In an embodiment of the present invention, when an event is received, the controller may display event information related to the received event together with the first screen information on the display unit, and when the touch is applied to the display unit, the controller may project the screen information corresponding to the first screen information through the projection unit and output second screen information corresponding to the event information to the display unit.

In an embodiment of the present invention, the event information is displayed to overlap with the first screen information, and the second screen information may be displayed on the entirety of the display unit.

In an embodiment of the present invention, only when the touch is applied to a region in which the first screen information is displayed, the controller may output the screen information corresponding to the first screen information through the projection unit.

In an embodiment of the present invention, when the touch is applied to a region in which the event information is displayed, the controller may project the second screen information through the projection unit and continuously display the first screen information on the display unit.

In an embodiment of the present invention, in the case in which the screen information corresponding to the first screen information is projected through the projection unit, the second screen information, which was output to the display unit before the first screen information was displayed, may be output again.

In an embodiment of the present invention, the screen information corresponding to the first screen information may be the first screen information itself or summary information of the first screen information.

In an embodiment of the present invention, the projection unit may include a plurality of projectors, and the screen information corresponding to the first screen information may be projected through a projector placed in a position corresponding to a direction in which the touch is applied, among the plurality of projectors.

In an embodiment of the present invention, the controller may control the projection unit such that a format in which the screen information corresponding to the first screen information is projected is varied according to a direction in which the touch is applied.

In an embodiment of the present invention, when the touch is applied in a first direction, the screen information corresponding to the first screen information may be output through the first projector among the plurality of projectors, and when the touch is applied in a second direction different from the first direction, the screen information corresponding to the first screen information may be output through a second projector different from the first projector among the plurality of projectors, and the screen information corresponding to the first screen information projected through the first projector may be summary information of the first screen information, and the screen information corresponding to the first screen information projected through the second projector may be the first screen information itself.

In an embodiment of the present invention, when a pre-set type touch is applied to the screen information corresponding to the first screen information projected through the projection unit, the controller may output again the first screen information to the display unit in response.

In an embodiment of the present invention, when the screen information corresponding to the first screen information is projected through the projection unit, the second information different from the first screen information may be displayed on the display unit, and when the touch is applied again to the display unit, while the second information is being displayed on the display unit, the controller may control the projection unit to project the screen information corresponding to the second screen information together with the screen information corresponding to the first screen information therethrough.

In an embodiment of the present invention, when one of the screen information corresponding to the second screen information and the screen information corresponding to the first screen information is dragged to the other, the controller may process functions corresponding to the first screen information and the second screen information in an associated manner in response.

In an embodiment of the present invention, the screen information projected through the projection unit may be displayed on a wrist or a back of a hand excluding the region wrapped with the body of the mobile terminal, and the controller may control the projection unit to vary a display size of the screen information corresponding to the first screen information according to an area of the wrist or the back of a hand.

In an embodiment of the present invention, in a case in which the screen information corresponding to the first screen information is displayed on the back of a hand, when the back of a hand is bent, the controller may control the projection unit to terminate projection of the screen information corresponding to the first screen information in response.

In an embodiment of the present invention, when the pre-set type touch is a pinch-in touch, the first screen information may be displayed in a magnified manner through the projection unit and the display unit.

To achieve these and other advantages and in accordance with the purpose of the present invention, as embodied and broadly described herein, the present invention provides in another aspect a control method of a mobile terminal including a body and a projection unit disposed on the side of the body, including: outputting first screen information to a display unit disposed on a front surface of the body; sensing a pre-set type touch applied to the display unit; and projecting screen information corresponding to the first screen information, which has been output to the display unit, through the projection unit in response to the sensed touch, and outputting second screen information different from the first screen information to the display unit.

In an embodiment of the present invention, when an event is received, event information related to the received event may be displayed together with the first screen information on the display unit, and when the touch is applied, the screen information corresponding to the first screen information may be projected through the projection unit and second screen information corresponding to the event information may be displayed on the display unit.

Further scope of applicability of the present invention will become apparent from the detailed description given hereinafter. However, it should be understood that the detailed description and specific examples, while indicating preferred embodiments of the invention, are given by illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings, which are given by illustration only, and thus are not limitative of the present invention, and wherein.

DETAILED DESCRIPTION OF THE INVENTION

The embodiments of the present invention will now be described with reference to the accompanying drawings, in which like numbers refer to like elements throughout although the embodiments are different, and a description of the like elements a first embodiment will be used for those of the different embodiment. In the following description, usage of suffixes such as 'module', 'part' or 'unit' used for referring to elements is given merely to facilitate explanation of the present invention, without having any significant meaning by itself. In describing the present invention, if a detailed explanation for a related known function or construction is considered to unnecessarily divert the gist of the present invention, such explanation has been omitted but would be understood by those skilled in the art. The accompanying drawings of the present invention aim to facilitate understanding of the present invention and should not be construed as limited to the accompanying drawings.

Mobile terminals described in the present disclosure may include mobile phones, smart phones, notebook computers, tablet computers, digital broadcast receivers, PDAs (Personal Digital Assistants), PMPs (Portable Multimedia Player), navigation devices, slate PCs, tablet PCs, ultrabooks, and the like. However, it would be understood by a person skilled in the art that the configuration according to embodiments of the present invention can be also applicable to the fixed types of terminals such as digital TVs, desk top computers, and the like, except for any elements especially configured for a mobile purpose.

Figure 1:
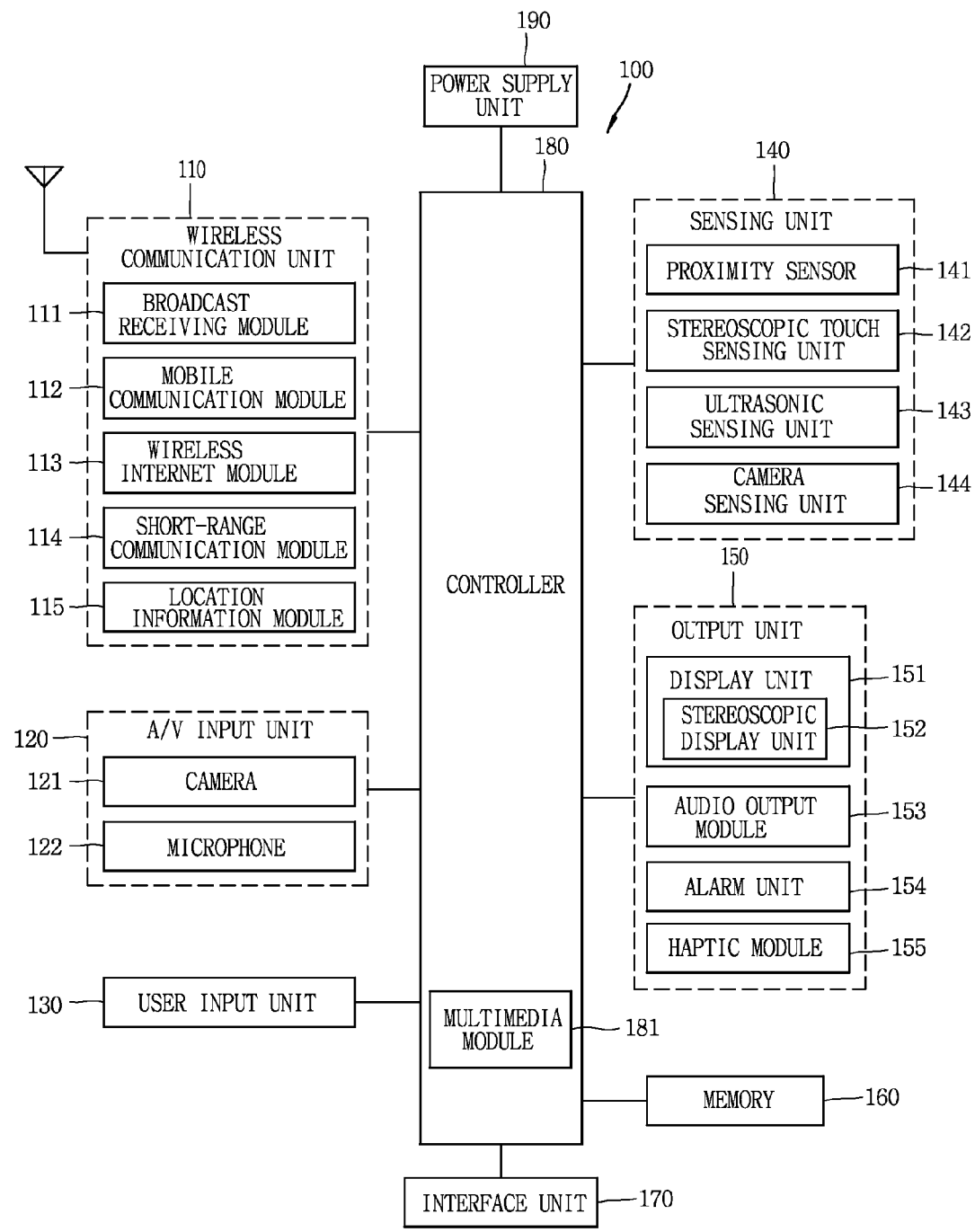
FIG. 1 is a block diagram of a mobile terminal according to an embodiment of the present invention.

FIG. 1 is a block diagram of a mobile terminal according to an embodiment of the present invention.

The mobile terminal 100 may include a wireless communication unit 110, an A/V (Audio/Video) input unit 120, a user input unit 130, a sensing unit 140, an output unit 150, a memory 160, an interface unit 170, a controller 180, and a power supply unit 190, etc. FIG. 1 shows the mobile terminal as having various components, but it should be understood that implementing all of the illustrated components is not a requirement. Greater or fewer components may alternatively be implemented.

The elements of the mobile terminal will be described in detail as follows.

The wireless communication unit 110 typically includes one or more modules allowing radio communication between the mobile terminal 100 and a wireless communication system or a network in which the mobile terminal is located. For example, the wireless communication unit may include at least one of a broadcast receiving module 111, a mobile communication module 112, a wireless Internet module 113, a short-range communication module 114, and a location information module 115.

The broadcast receiving module 111 receives broadcast signals and/or broadcast associated information from an external broadcast management server (or other network entity) via a broadcast channel.

The broadcast channel may include a satellite channel and/or a terrestrial channel. The broadcast management server may be a server that generates and transmits a broadcast signal and/or broadcast associated information or a server that receives a previously generated broadcast signal and/or broadcast associated information and transmits the same to a terminal. The broadcast signal may include a TV broadcast signal, a radio broadcast signal, a data broadcast signal, and the like. Also, the broadcast signal may further include a broadcast signal combined with a TV or radio broadcast signal.

The broadcast associated information may refer to information associated with a broadcast channel, a broadcast program or a broadcast service provider. The broadcast associated information may also be provided via a mobile communication network and, in this case, the broadcast associated information may be received by the mobile communication module 112.

The broadcast associated information may exist in various forms. For example, it may exist in the form of an electronic program guide (EPG) of digital multimedia broadcasting (DMB), electronic service guide (ESG) of digital video broadcast-handheld (DVB-H), and the like.

The broadcast receiving module 111 may be configured to receive signals broadcast by using various types of broadcast systems. In particular, the broadcast receiving module 111 may receive a digital broadcast by using a digital broadcast system such as multimedia broadcasting-terrestrial (DMB-T), digital multimedia broadcasting-satellite (DMB-S), digital video broadcast-handheld (DVB-H), the data broadcasting system known as media forward link only (MediaFLO®), integrated services digital broadcast-terrestrial (ISDB-T), etc. The broadcast receiving module 111 may be configured to be suitable for every broadcast system that provides a broadcast signal as well as the above-mentioned digital broadcast systems.

Broadcast signals and/or broadcast-associated information received via the broadcast receiving module 111 may be stored in the memory 160.

The mobile communication module 112 transmits and/or receives radio signals to and/or from at least one of a base station, an external terminal and a server. Such radio signals may include a voice call signal, a video call signal or various types of data according to text and/or multimedia message transmission and/or reception.

The wireless Internet module 113 supports wireless Internet access for the mobile terminal. This module may be internally or externally coupled to the terminal. The wireless Internet access technique implemented may include a WLAN (Wireless LAN) (Wi-Fi), Wibro (Wireless broadband), Wimax (World Interoperability for Microwave Access), HSDPA (High Speed Downlink Packet Access), or the like.

The short-range communication module 114 is a module for supporting short range communications. Some examples of short-range communication technology include Bluetooth™, Radio Frequency IDentification (RFID), Infrared Data Association (IrDA), Ultra-WideBand (UWB), ZigBee™, and the like.

The location information module 115 is a module for checking or acquiring a location (or position) of the mobile terminal. A typical example of the location information module is a GPS (Global Positioning System).

With reference to FIG. 1, the A/V input unit 120 is configured to receive an audio or video signal. The NV input unit 120 may include a camera 121 and a microphone 122. The camera 121 processes image data of still pictures or video obtained by an image capture device in a video capturing mode or an image capturing mode. The processed image frames may be displayed on a display unit 151.

The image frames processed by the camera 121 may be stored in the memory 160 (or other storage medium) or transmitted via the wireless communication unit 110. Two or more cameras 121 may be provided according to the configuration of the mobile terminal.

The microphone 122 may receive sounds (audible data) via a microphone in a phone call mode, a recording mode, a voice recognition mode, and the like, and can process such sounds into audio data. The processed audio (voice) data may be converted for output into a format transmittable to a mobile communication base station via the mobile communication module 112 in case of the phone call mode. The microphone 122 may implement various types of noise canceling (or suppression) algorithms to cancel (or suppress) noise or interference generated in the course of receiving and transmitting audio signals.

The user input unit 130 may generate input data from commands entered by a user to control various operations of the mobile terminal. The user input unit 130 may include a keypad, a dome switch, a touch pad, a jog wheel, a jog switch, and the like.

The sensing unit 140 detects a current status (or state) of the mobile terminal 100 such as an opened or closed state of the mobile terminal 100, a location of the mobile terminal 100, the presence or absence of user contact with the mobile terminal 100 (i.e., touch inputs), the orientation of the mobile terminal 100, an acceleration or deceleration movement and direction of the mobile terminal 100, etc., and generates commands or signals for controlling the operation of the mobile terminal 100. For example, when the mobile terminal 100 is implemented as a slide type mobile phone, the sensing unit 140 may sense whether the slide phone is opened or closed. In addition, the sensing unit 140 can detect whether or not the power supply unit 190 supplies power or whether or not the interface unit 170 is coupled with an external device.

The output unit 150 is configured to provide outputs in a visual, audible, and/or tactile manner (e.g., audio signal, video signal, alarm signal, vibration signal, etc.). The output unit 150 may include the display unit 151, an audio output module 152, an alarm unit 153, a haptic module 154, and the like.

The display unit 151 may display (output) information processed in the mobile terminal 100. For example, when the mobile terminal 100 is in a phone call mode, the display unit 151 may display a User Interface (UI) or a Graphic User Interface (GUI) associated with a call or other communication (such as text messaging, multimedia file downloading, etc.). When the mobile terminal 100 is in a video call mode or image capturing mode, the display unit 151 may display a captured image and/or received image, a UI or GUI that shows videos or images and functions related thereto, and the like.

The display unit 151 may include at least one of a Liquid Crystal Display (LCD), a Thin Film Transistor-LCD (TFT-LCD), an Organic Light Emitting Diode (OLED) display, a flexible display, a three-dimensional (3D) display, and an e-ink display.

Some of them may be configured to be transparent or light-transmissive to allow viewing of the exterior, which may be called transparent displays. A typical transparent display may be, for example, a TOLED (Transparent Organic Light Emitting Diode) display, or the like. Through such configuration, the user can view an object positioned at the rear side of the terminal body through the region occupied by the display unit 151 of the terminal body.

The mobile terminal 100 may include two or more display units according to its particular desired embodiment. For example, a plurality of display units may be separately or integrally disposed on one surface of the mobile terminal, or may be separately disposed on mutually different surfaces.

Meanwhile, when the display unit 151 and a sensor (referred to as a 'touch sensor', hereinafter) for detecting a touch operation are overlaid in a layered manner to form a touch screen, the display unit 151 may function as both an input device and an output device. The touch sensor may have a form of a touch film, a touch sheet, a touch pad, and the like.

The touch sensor may be configured to convert pressure applied to a particular portion of the display unit 151 or a change in the capacitance or the like generated at a particular portion of the display unit 151 into an electrical input signal. The touch sensor may be configured to detect the pressure when a touch is applied, as well as the touched position and area.

When there is a touch input with respect to the touch sensor, a corresponding signal (signals) are transmitted to a touch controller. The touch controller processes the signals and transmits corresponding data to the controller 180. Accordingly, the controller 180 may recognize which portion of the display unit 151 has been touched.

With reference to FIG. 1, a proximity sensor 141 may be disposed within or near the touch screen. The proximity sensor 141 is a sensor for detecting the presence or absence of an object relative to a certain detection surface or an object that exists nearby by using the force of electromagnetism or infrared rays without a physical contact. Thus, the proximity sensor 141 has a considerably longer life span compared with a contact type sensor, and it can be utilized for various purposes.

Examples of the proximity sensor 141 may include a transmission type photoelectric sensor, a direct reflection type photoelectric sensor, a mirror-reflection type photoelectric sensor, an RF oscillation type proximity sensor, a capacitance type proximity sensor, a magnetic proximity sensor, an infrared proximity sensor, and the like. In case where the touch screen is the capacitance type, proximity of the pointer is detected by a change in electric field according to the proximity of the pointer. In this case, the touch screen (touch sensor) may be classified as a proximity sensor.

In the following description, for the sake of brevity, recognition of the pointer positioned to be close to the touch screen will be called a 'proximity touch', while recognition of actual contacting of the pointer on the touch screen will be called a 'contact touch'. In this case, when the pointer is in the state of the proximity touch, it means that the pointer is positioned to correspond vertically to the touch screen.

By employing the proximity sensor 141, a proximity touch and a proximity touch pattern (e.g., a proximity touch distance, a proximity touch speed, a proximity touch time, a proximity touch position, a proximity touch movement state, or the like) can be detected, and information corresponding to the detected proximity touch operation and the proximity touch pattern can be outputted to the touch screen.

The audio output module 152 may convert and output as sound audio data received from the wireless communication unit 110 or stored in the memory 160 in a call signal reception mode, a call mode, a record mode, a voice recognition mode, a broadcast reception mode, and the like. Also, the audio output module 152 may provide audible outputs related to a particular function performed by the mobile terminal 100 (e.g., a call signal reception sound, a message reception sound, etc.). The audio output module 152 may include a speaker, a buzzer, or other sound generating device.

The alarm unit 153 may provide outputs to inform about the occurrence of an event of the mobile terminal 100. Typical events may include call reception, message reception, key signal inputs, a touch input etc. In addition to audio or video outputs, the alarm unit 153 may provide outputs in a different manner to inform about the occurrence of an event. For example, the alarm unit 153 may provide an output in the form of vibrations. When a call, a message, or some other incoming communication is received, the alarm unit 153 may provide tactile outputs (i.e., vibrations) to inform the user thereof. By providing such tactile outputs, the user can recognize the occurrence of various events even if his mobile phone is in the user's pocket. Outputs informing about the occurrence of an event may be also provided via the display unit 151 or the audio output module 152. The display unit 151 and the audio output module 152 may be classified as a part of the alarm unit 153.

The haptic module 154 generates various tactile effects the user may feel. A typical example of the tactile effects generated by the haptic module 154 is vibration. The strength and pattern of the haptic module 154 can be controlled. For example, different vibrations may be combined to be outputted or sequentially outputted.

Besides vibration, the haptic module 154 may generate various other tactile effects such as an effect by stimulation such as a pin arrangement vertically moving with respect to a contact skin, a spray force or suction force of air through a jet orifice or a suction opening, a contact on the skin, a contact of an electrode, electrostatic force, etc., an effect by reproducing the sense of cold and warmth using an element that can absorb or generate heat.

The haptic module 154 may be implemented to allow the user to feel a tactile effect through a muscle sensation such as fingers or arm of the user, as well as transferring the tactile effect through a direct contact. Two or more haptic modules 154 may be provided according to the configuration of the mobile terminal 100.

The memory 160 may store software programs used for the processing and controlling operations performed by the controller 180, or may temporarily store data (e.g., a phonebook, messages, still images, video, etc.) that are inputted or outputted. In addition, the memory 160 may store data regarding various patterns of vibrations and audio signals outputted when a touch is inputted to the touch screen.

The memory 160 may include at least one type of storage medium including a Flash memory, a hard disk, a multimedia card micro type, a card-type memory (e.g., SD or DX memory, etc), a Random Access Memory (RAM), a Static Random Access Memory (SRAM), a Read-Only Memory (ROM), an Electrically Erasable Programmable Read-Only Memory (EEPROM), a Programmable Read-Only memory (PROM), a magnetic memory, a magnetic disk, and an optical disk. Also, the mobile terminal 100 may be operated in relation to a web storage device that performs the storage function of the memory 160 over the Internet.

The interface unit 170 serves as an interface with every external device connected with the mobile terminal 100. For example, the external devices may transmit data to an external device, receives and transmits power to each element of the mobile terminal 100, or transmits internal data of the mobile terminal 100 to an external device. For example, the interface unit 170 may include wired or wireless headset ports, external power supply ports, wired or wireless data ports, memory card ports, ports for connecting a device having an identification module, audio input/output (I/O) ports, video I/O ports, earphone ports, or the like.

The identification module may be a chip that stores various information for authenticating the authority of using the mobile terminal 100 and may include a user identity module (UIM), a subscriber identity module (SIM) a universal subscriber identity module (USIM), and the like. In addition, the device having the identification module (referred to as 'identifying device', hereinafter) may take the form of a smart card. Accordingly, the identifying device may be connected with the terminal 100 via a port.

When the mobile terminal 100 is connected with an external cradle, the interface unit 170 may serve as a passage to allow power from the cradle to be supplied therethrough to the mobile terminal 100 or may serve as a passage to allow various command signals inputted by the user from the cradle to be transferred to the mobile terminal therethrough. Various command signals or power inputted from the cradle may operate as signals for recognizing that the mobile terminal is properly mounted on the cradle.

The controller 180 typically controls the general operations of the mobile terminal. For example, the controller 180 performs controlling and processing associated with voice calls, data communications, video calls, and the like. The controller 180 may include a multimedia module 181 for reproducing multimedia data. The multimedia module 181 may be configured within the controller 180 or may be configured to be separated from the controller 180.

The controller 180 may perform a pattern recognition processing to recognize a handwriting input or a picture drawing input performed on the touch screen as characters or images, respectively.

Also, when a state of the mobile terminal satisfies pre-set conditions, the controller 180 may execute a locked state for limiting an input of a control command of the user with respect to applications. Also, in a locked state, the controller may control a locked screen displayed on the locked state based on a touch input sensed through the display unit.

The power supply unit 190 receives external power or internal power and supplies appropriate power required for operating respective elements and components under the control of the controller 180.

Various embodiments described herein may be implemented in a computer-readable or its similar medium using, for example, software, hardware, or any combination thereof.

For hardware implementation, the embodiments described herein may be implemented by using at least one of application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic units designed to perform the functions described herein. In some cases, such embodiments may be implemented by the controller 180 itself.

For software implementation, the embodiments such as procedures or functions described herein may be implemented by separate software modules. Each software module may perform one or more functions or operations described herein.

Software codes can be implemented by a software application written in any suitable programming language. The software codes may be stored in the memory 160 and executed by the controller 180.

Hereinafter, a communication system implementable through the mobile terminal 100 according to an embodiment of the present invention will be described.

Figure 2A:
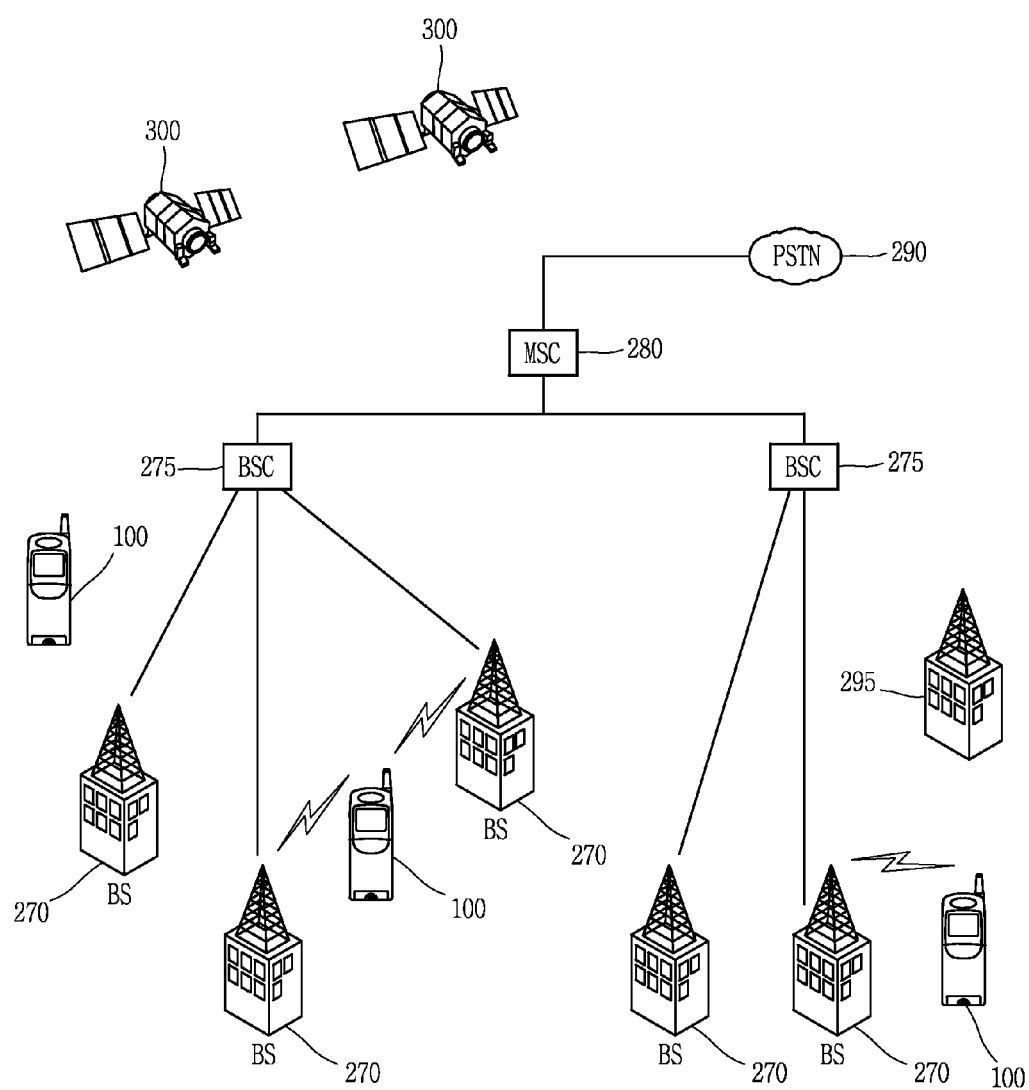
FIGS. 2A and 2B are conceptual views of a communication system in which the mobile terminal according to an embodiment of the present invention is operable.
Figure 2B:
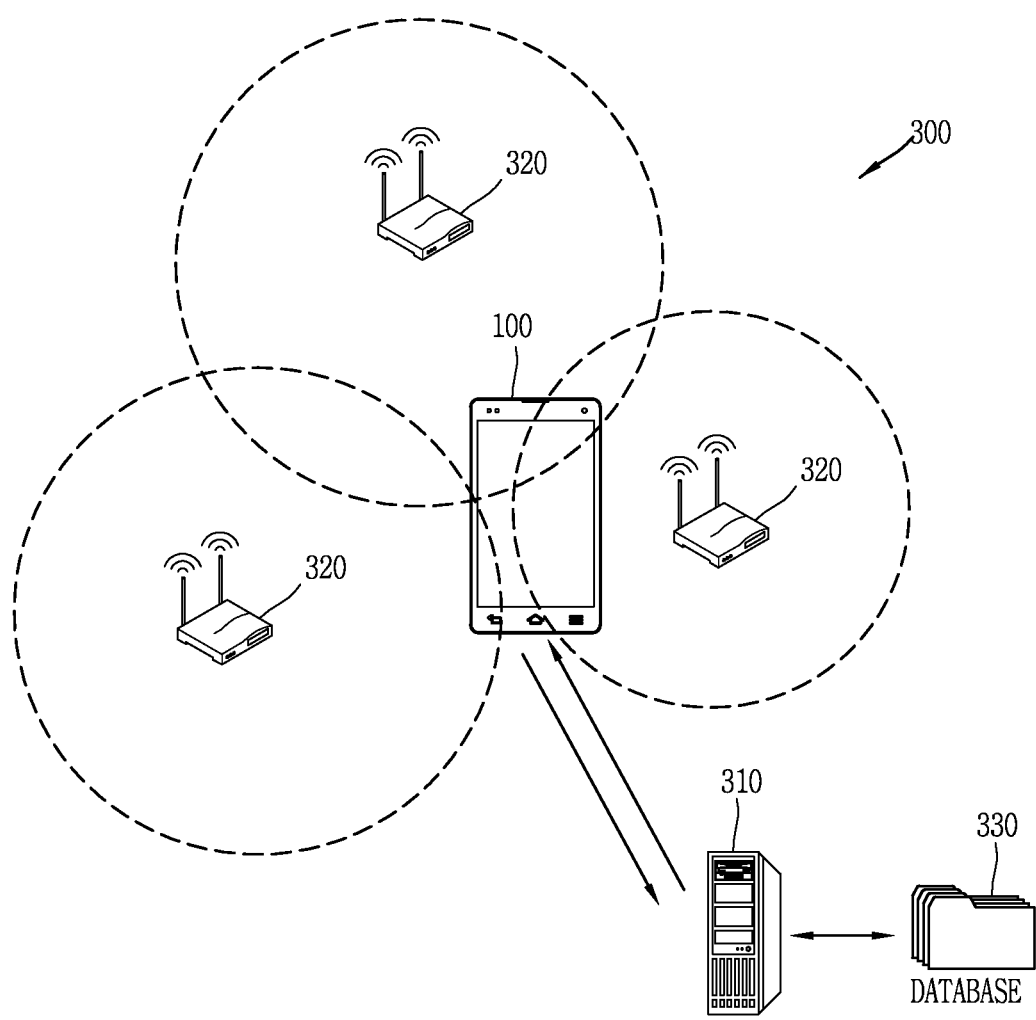

FIGS. 2A and 2B are conceptual views of communication systems in which the mobile terminal 100 according to an embodiment of the present invention is operable.

First, referring to FIG. 2A, a communication system may use different air interfaces and/or physical layers. For example, air interfaces utilized by the communication systems include example, frequency division multiple access (FDMA), time division multiple access (TDMA), code division multiple access (CDMA), and universal mobile telecommunications system (UMTS) (in particular, long term evolution (LTE)), global system for mobile communications (GSM), and the like. As a non-limiting example, the description hereafter relates to a CDMA communication system, but such teachings apply equally to other types of systems.

Hereinafter, for the description purpose, CDMA will be described, but, obviously, the present invention is applicable to any communication system including a CDMA wireless communication system.

Referring to FIG. 2, a CDMA wireless communication system may include a plurality of mobile terminals 100, a plurality of base stations (BSs) 270, base station controllers (BSCs) 275, and a mobile switching center (MSC) 280. The MSC 280 is configured to interface with a public switch telephone network (PSTN) 290. The MSC 280 is also configured to interface with the BSCs 275, which may be coupled to the base stations 270 via backhaul lines. The backhaul lines may be configured in accordance with any of several known interfaces including, for example, E1/T1, ATM, IP, PPP, Frame Relay, HDSL, ADSL, or xDSL. It is to be understood that the system as shown in FIG. 2 may include a plurality of BSCs 275.

Each BS 270 may serve one or more sectors (or regions), each sector covered by an omni-directional antenna or an antenna pointed in a particular direction radially away from the BS 270. Alternatively, each sector may be covered by two or more antennas for diversity reception. Each BS 270 may be configured to support a plurality of frequency assignments, and each frequency assignment has a particular spectrum (e.g., 1.25 MHz, 5 MHz, etc).

The intersection of a sector and frequency assignment may be referred to as a CDMA channel. The BS 270 may also be referred to as base station transceiver subsystems (BTSs) or other equivalent terms. In such case, the term "base station" may be used to collectively refer to a single BSC 275 and at least one BS 270. The base station may also be referred to as a "cell site". Alternatively, individual sectors of a particular BS 270 may be referred to as a plurality of cell sites.

As shown in FIG. 2A, a broadcasting transmitter (BT) 295 transmits a broadcast signal to the mobile terminals 100 operating within the system. The broadcast receiving module 111 as shown in FIG. 1 is provided at the terminal 100 to receive broadcast signals transmitted by the BT 295.

Also, in FIG. 2A, several global positioning systems (GPS) satellites 300 are shown. The satellites 300 help locate at least one of a plurality of terminals 100. In FIG. 2, several satellites 300 are depicted, but it is understood that useful positioning information may be obtained with any number of satellites. The GPS module 115 as shown in FIG. 1 is typically configured to cooperate with the satellites 300 to obtain desired positioning information. Instead of or in addition to GPS tracking techniques, other technologies that may track the location of the mobile terminals may be used. In addition, at least one of the GPS satellites 300 may selectively or additionally handle satellite DMB transmissions.

As one typical operation of the wireless communication system, the BSs 270 receive reverse-link signals from various mobile terminals 100. The mobile terminals 100 typically engaging in calls, messaging, and other types of communications. Each reverse-link signal received by a particular base station 270 is processed within the particular BS 270. The resulting data is forwarded to an associated BSC 275. The BSC provides call resource allocation and mobility management functionality including the coordination of soft handoff procedures between BSs 270. The BSCs 275 also route the received data to the MSC 280, which provides additional routing services for interfacing with the PSTN 290. Similarly, the PSTN 290 interfaces with the MSC 280, the MSC interfaces with the BSCs 275, and the BSCs 275 in turn control the BSs 270 to transmit forward-link signals to the mobile terminals 100.

Next, a method of acquiring the location information of a mobile terminal using a WiFi (Wireless Fidelity) positioning system (WPS) will be described with reference to FIG. 2B.

The WiFi positioning system (WPS) 300 refers to a location determination technology based on a wireless local area network (WLAN) using WiFi as a technology for tracking the location of the mobile terminal 100 using a WiFi module provided in the mobile terminal 100 and a wireless access point 320 for transmitting and receiving to and from the WiFi module.

The WiFi positioning system 300 may include a WiFi location determination server 310, a mobile terminal 100, a wireless access point (AP) 320 connected to the mobile terminal 100, and a database 330 stored with any wireless AP information.

The WiFi location determination server 310 extracts the information of the wireless AP 320 connected to the mobile terminal 100 based on a location information request message (or signal) of the mobile terminal 100. The information of the wireless AP 320 may be transmitted to the WiFi location determination server 310 through the mobile terminal 100 or transmitted to the WiFi location determination server 310 from the wireless AP 320.

The information of the wireless AP extracted based on the location information request message of the mobile terminal 100 may be at least one of MAC address, SSID, RSSI, channel information, privacy, network type, signal strength and noise strength.

The WiFi location determination server 310 receives the information of the wireless AP 320 connected to the mobile terminal 100 as described above, and compares the received wireless AP 320 information with information contained in the pre-established database 330 to extract (or analyze) the location information of the mobile terminal 100.

On the other hand, referring to FIG. 2B, as an example, the wireless AP connected to the mobile terminal 100 is illustrated as a first, a second, and a third wireless AP 320. However, the number of wireless APs connected to the mobile terminal 100 may be changed in various ways according to a wireless communication environment in which the mobile terminal 100 is located. When the mobile terminal 100 is connected to at least one of wireless APs, the WiFi positioning system 300 can track the location of the mobile terminal 100.

Next, considering the database 330 stored with any wireless AP information in more detail, various information of any wireless APs disposed at different locations may be stored in the database 330.

The information of any wireless APs stored in the database 330 may be information such as MAC address, SSID, RSSI, channel information, privacy, network type, latitude and longitude coordinate, building at which the wireless AP is located, floor number, detailed indoor location information (GPS coordinate available), AP owner's address, phone number, and the like.

In this manner, any wireless AP information and location information corresponding to the any wireless AP are stored together in the database 330, and thus the WiFi location determination server 310 may retrieve wireless AP information corresponding to the information of the wireless AP 320 connected to the mobile terminal 100 from the database 330 to extract the location information matched to the searched wireless AP, thereby extracting the location information of the mobile terminal 100.

Furthermore, the extracted location information of the mobile terminal 100 may be transmitted to the mobile terminal 100 through the WiFi location determination server 310, thereby acquiring the location information of the mobile terminal 100.

Meanwhile, in an embodiment of the present invention, information processed in the mobile terminal 100 may be displayed by using the flexible display. Hereinafter, a flexible display unit will be described in detail with reference to the accompanying drawings.

Figure 3A:
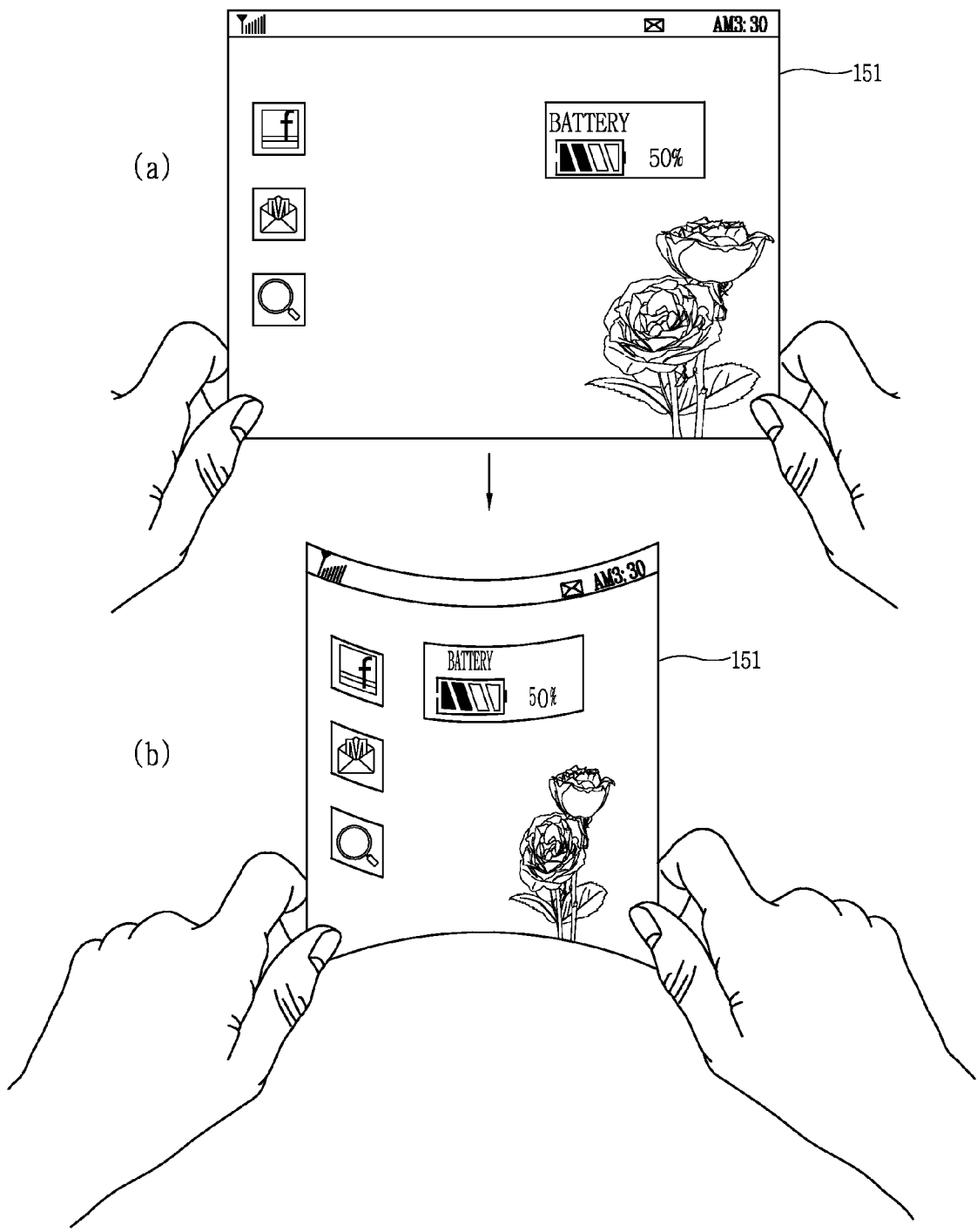
FIGS. 3A and 3B are conceptual views illustrating a flexible display unit included in the mobile terminal according to an embodiment of the present invention.
Figure 3B:
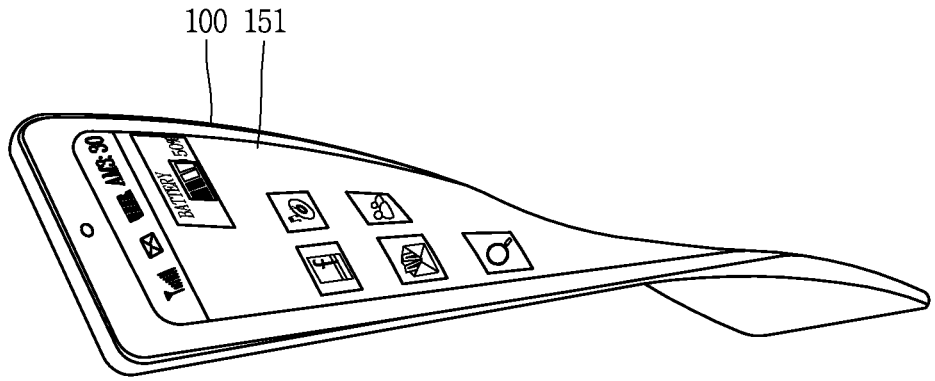

FIGS. 3A and 3B are conceptual views illustrating a flexible display unit 151 included in the mobile terminal according to an embodiment of the present invention.

As illustrated in (a) and (b) of FIG. 3A, the flexible display unit 151 may include a display which is bendable, foldable, and rollable by physical force applied from the outside. Here, the flexible display unit 151 may include a general flexible display and an electronic paper (or e-paper).

Here, a general flexible display refers to a display which is fabricated on a thin, flexible substrate which is bendable, foldable, and rollable, like paper, while maintaining display characteristics of an existing flat panel display, and thus, which is light in weight and not brittle.

Also, e-paper, a display technology employing the general features of ink, is different from a general flat panel display, in that it uses reflective light. In case of e-paper, pictures or characters may be changed by using twist balls or by using electrophoresis using capsules.

Meanwhile, the sensing unit 140 (please see FIG. 1) is included in the flexible display unit 151. The sensing unit 140 may sense information regarding bending of the flexible display unit 151. In the present disclosure, the word 'bending' may include all the meanings of 'bent', 'rolled', and 'folded'.

The sensing unit 140 may be disposed on the flexible display unit 151 on the whole or may be disposed on a portion thereof, and may sense information regarding bending of the flexible display unit 151. Here, the information regarding bending of the flexible display unit 151 may include information regarding a direction in which the flexible display unit 151 is bent, information regarding a degree to which the flexible display unit 151 is bent, information regarding a position at which the flexible display unit 151 is bent, information regarding a time duration in which the flexible display unit 151 is maintained in a bent state, and information regarding acceleration at which a bent flexible display unit 151 returns to its original state, and the like. Besides, information regarding bending of the flexible display unit 151 may include various other information that may be sensed due to bending of the flexible display unit 151.

Also, on the basis of information regarding bending of the flexible display unit 151 sensed by the sensing unit 140, the controller 180 may change information displayed on the flexible display unit 151 or may generate a control signal for controlling a function of the mobile terminal 100.

For example, as illustrated in (a) and (b) of FIG. 3A, when the flexible display unit 151 is bent in response to external physical force applied thereto, the controller 180 may realign, separate, or synthesize screen images already displayed on the flexible display unit 151, or may change a piece of music, on the basis of a direction in which the flexible display unit 151 is bent, an angle at which the flexible display unit 151 is bent, and return acceleration at which the flexible display unit 151 is returned to its original state.

In an embodiment, as illustrated in (a) and (b) of FIG. 3A, when the flexible display unit 151 is bent inwardly by external physical force, the controller 180 may display screen images such that they are close to each other on the flexible display unit 151. Also, in another embodiment, when the flexible display unit 151 is outwardly bent by external physical force, the controller 180 may display screen images such that they are separated from each other on the flexible display unit 151.

Besides, the controller 180 may variously control methods for displaying information on the flexible display unit 151 such that the user may accurately recognize information displayed on the flexible display unit 151 according to bending of the flexible display unit 151.

Meanwhile, as illustrated in FIG. 3B, the mobile terminal 100 may include a case surrounding the flexible display unit 151. Also, in consideration of the characteristics of the flexible display unit 151, the case may be configured to be bendable together with the flexible display unit 151 by external physical force.

Meanwhile, as mentioned above, in response to information regarding bending of the flexible display unit 151, the controller 180 may generate a control signal related to a function of the mobile terminal 100 according to an embodiment of the present invention.

As described above, the mobile terminals are evolving toward having various designs, and due to due to the characteristics that they are lightweight and not brittle, flexible displays have come to prominence. Flexible displays may create new user interface areas which are limited or impossible with existing glass substrate-based displays. Thus, as flexible displays have come to prominence, demands for user interfaces using the characteristics of flexible displays have emerged.

Hereinafter, the mobile terminal 100 capable of enhancing user convenience in displaying screen information on the display unit 151 of the mobile terminal that wraps around a user's wrist, and a control method thereof will be described with reference to the accompanying drawings.

Figure 4:
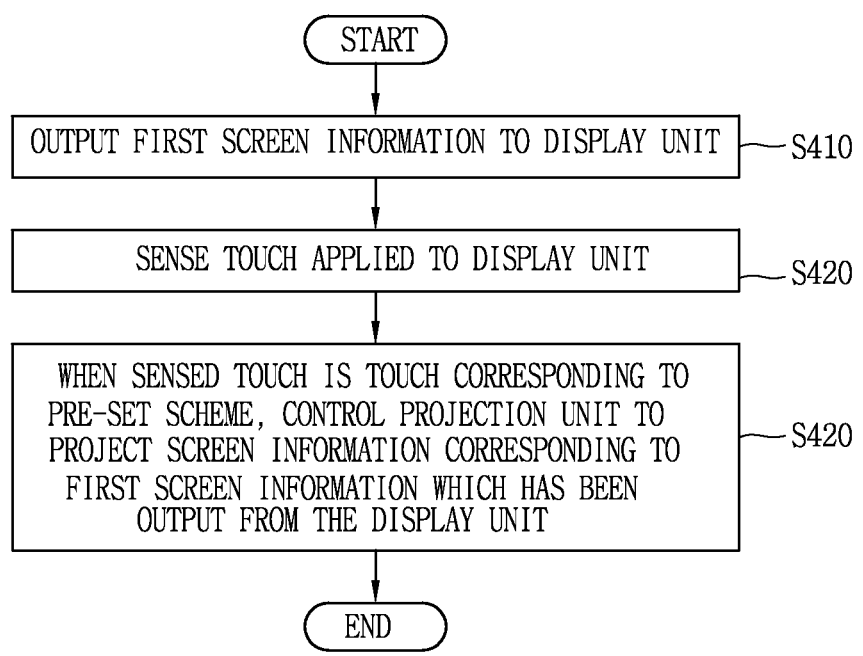
FIG. 4 is a flow chart illustrating an example of the mobile terminal according to an embodiment of the present invention.
Figure 5:
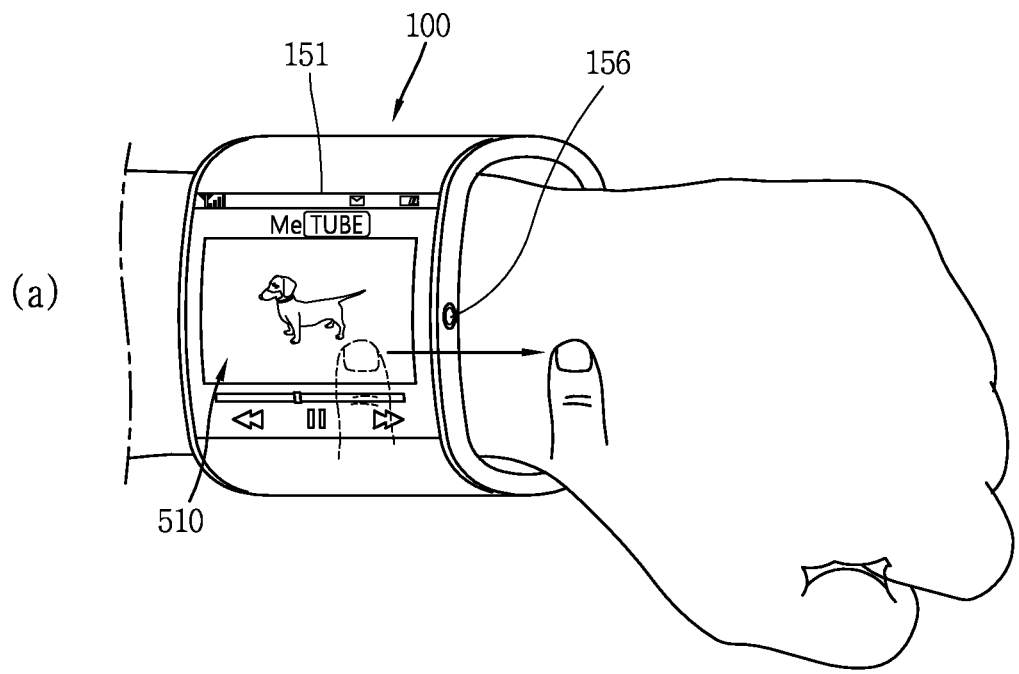
FIG. 5 is a conceptual view illustrating a control method according to the flow chart of FIG. 4.
Figure 5:
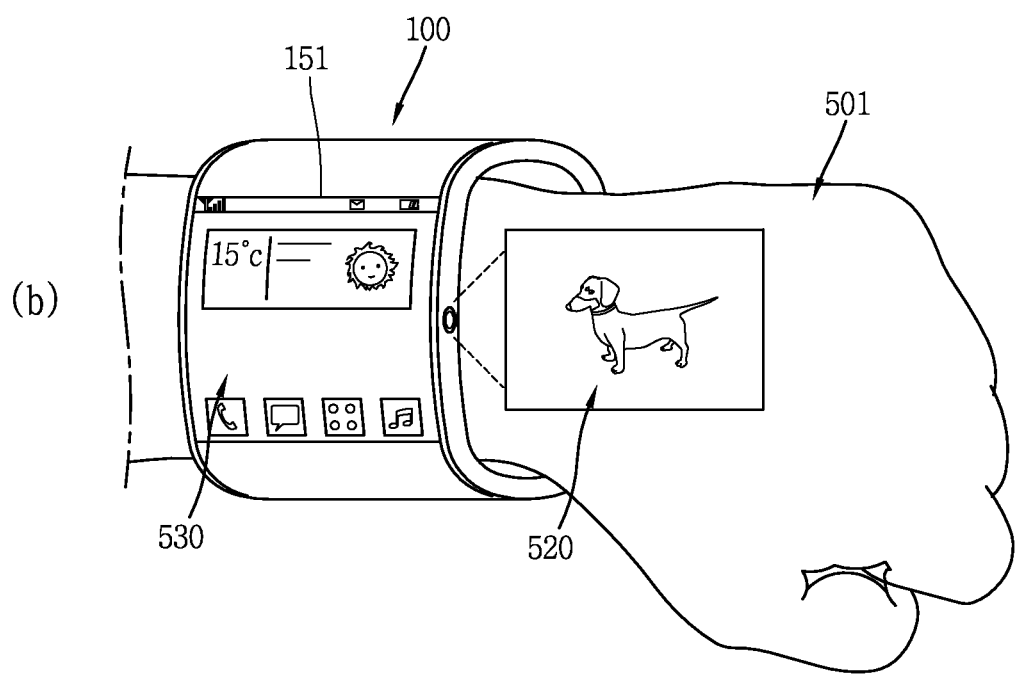

FIG. 4 is a flow chart illustrating an example of the mobile terminal according to an embodiment of the present invention, and FIG. 5 is a conceptual view illustrating a control method according to the flow chart of FIG. 4.

FIG. 4 is a flow chart illustrating an example of the mobile terminal 100 (please see FIG. 1) according to an embodiment of the present invention. The mobile terminal 100 includes a body, the display unit 151 (please see FIG. 1), a projection unit (not shown), and the controller 180 (please see FIG. 1). Here, the display unit 151 may include a flexible display unit and any other display units.

Although not shown, the projection unit may include a light source element, an image formation module, and a lens. Here, the light source element emits light, and the image formation module forms image information (or screen information) by using light. The lens allows image information to be projected in a magnified manner therethrough, and may be disposed to correspond to a projection hole. The projection unit may be referred to as a projector, a beam or a beam projector. As illustrated in FIG. 5, the projection unit 156 may be disposed on the side of the body 100 of the mobile terminal. Also, although not shown, the projection unit 156 may be disposed in any portion of the body 100 of the mobile terminal.

Meanwhile, referring to FIG. 4, first screen information is output to the display unit 151 (S410). Here, the screen information may be a graphic image or a graphic user interface (GUI) that may be output to the display unit 151, regardless of a type thereof. For example, the first screen information output to the display unit 151 may be an executed screen of an application being currently executed in the mobile terminal.

In this manner, in a state in which screen information is displayed on the display unit 151, when a touch is applied to the display unit 151, a touch sensor or a sensing unit provided in the display unit 151 may sense the touch (S420).

When the sensed touch is a touch corresponding to a pre-set type of touch, the projection unit is controlled to project screen information corresponding to the first screen information which has been displayed on the display unit 151 (S430).

For example, in a state in which the first screen information 510 is displayed on the display unit 151 as illustrated in (a) of FIG. 5, when a pre-set type touch is applied to the display unit 151, the controller 180 may control the projection unit 156 to project screen information 520 corresponding to the first screen information therethrough as illustrated in (b) of FIG. 5.

Accordingly, the screen information 520 corresponding to the first screen information may be output to the back of the user's hand, the user's wrist, or any other object.

Here, the pre-set type touch input may be a drag type touch input, a slide type touch input, or a flick type touch input moving from one point of the display unit in a direction in which the projection unit 156 is positioned. In addition, the pre-set type touch input may be a drag, slide, or flick type touch input applied at more than a reference speed.

Also, the pre-set type touch input may be a drag, slide, or flick type touch input applied, starting from one point of the display unit 151, until when it gets out of the display unit 151. In this manner, the pre-set type touch input may be implemented in various manners.

Meanwhile, the screen information 520 corresponding to the first screen information may be the first screen information itself or may be at least a portion of the first screen information 510, summary information of the first screen information 510, or a menu screen regarding the first screen information 510. Namely, the screen information 520 corresponding to the first screen information may be any information as long as it is related to the first screen information 510.

Meanwhile, when the screen information 520 corresponding to the first screen information is projected through the projection unit 156, screen information 530 different from the first screen information 510 may be displayed on the display unit 151 as illustrated in (b) of FIG. 5. Here, the different screen information 530 may be screen information which was displayed on the display unit 151 before the first screen information 510 was output to the display unit 151.

Also, although not shown, in a case in which the screen information 520 corresponding to the first screen information is summary information of the first screen information 510 or a menu screen with respect to the first screen information 510, the first screen information 510 may be continuously output to the display unit 151.

In this manner, when the screen information (or image information) is projected through the projection unit 156, the screen information (or image information) output to the display unit 151 may be variously modified.

Meanwhile, the screen information or image information projected through the projection unit 156 may be displayed on a wrist or the back of a hand, excluding the region covered by the mobile terminal body 100, and in this case, the controller 180 may control the projection unit 156 such that a display size of the screen information 520 corresponding to the first screen information is varied according to an area of the wrist or the back of a hand.

As described above, in the mobile terminal according to an embodiment of the present invention, since the screen information is additionally output through the projection unit, a spatial restriction of the display unit which wraps around the user's wrist can be resolved.

Hereinafter, a method for outputting screen information (or image information) through the projection unit in response to a touch applied to the display unit will be described in detail. FIGS. 6A, 6B, 6C, 6D, 6E and 6F are conceptual views illustrating a method for displaying information by using a projector in the mobile terminal according to an embodiment of the present invention.

Figure 6A:
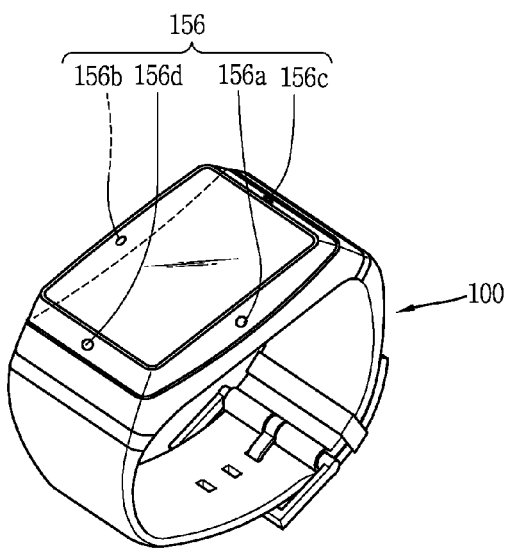
FIGS. 6A, 6B, 6C, 6D, 6E and 6F are conceptual views illustrating a method for displaying information by using a projector in the mobile terminal according to an embodiment of the present invention.

First, as illustrated in FIG. 6A, the mobile terminal according to an embodiment of the present invention includes the projection unit 156, and the projection unit 156 may include at least one projectors 156a, 156b, 156c, and 156d.

Namely, in the mobile terminal according to an embodiment of the present invention may output the screen information (or image information) through the plurality of projectors 156a, 156b, 156c, and 156d, respectively.

Meanwhile, through which of the plurality of projectors 156a, 156b 156c, and 156d screen information is to be output may be determined according to a direction in which a touch is applied to the display unit 151. Namely, the screen information corresponding to the first screen information output to the display unit 151 may be projected through a projector positioned in a place corresponding to a direction in which a touch is applied to the display unit 151, among the plurality of projectors.

Figure 6B:
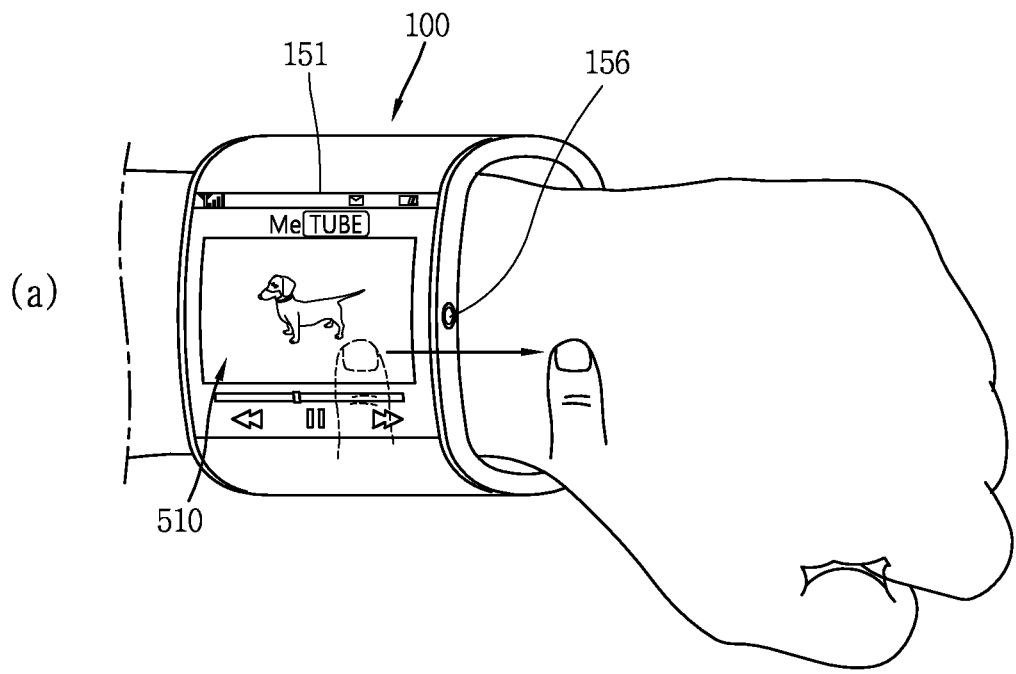
Figure 6B:
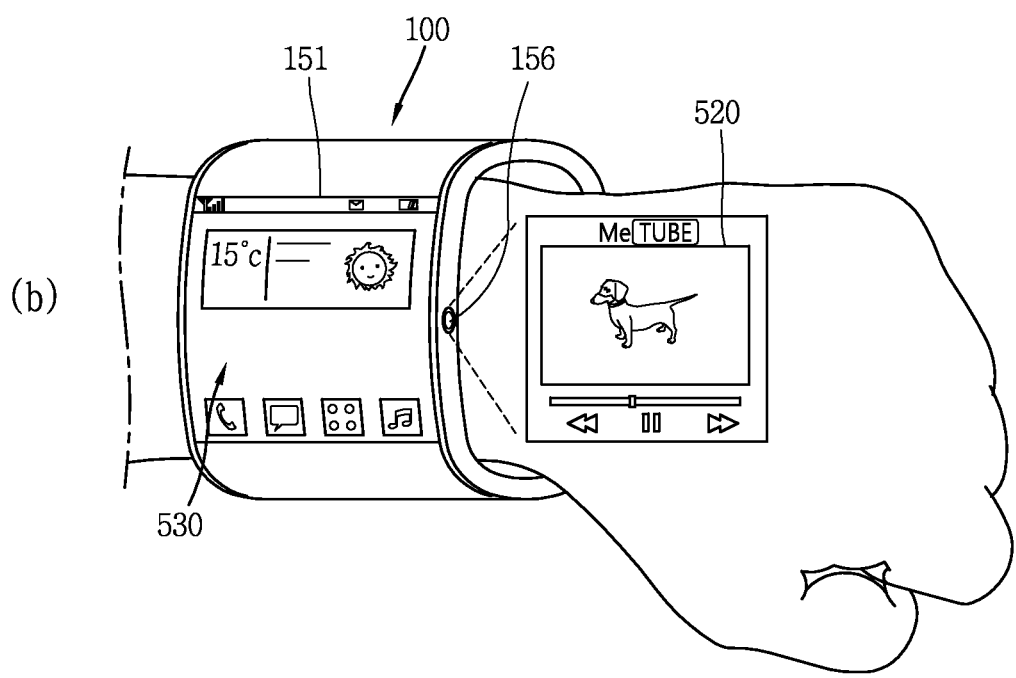

For example, as illustrated in (a) of FIG. 6B, in a state in which the first screen information 510 is output to the display unit 151, when a touch starting from one point of the display unit 151 is continuously applied toward the first projector 156a, the controller 180 may control the first projector 156a to output the screen information 520 corresponding to the first screen information therethrough as illustrated in (b) of FIG. 6B.

Figure 6C:
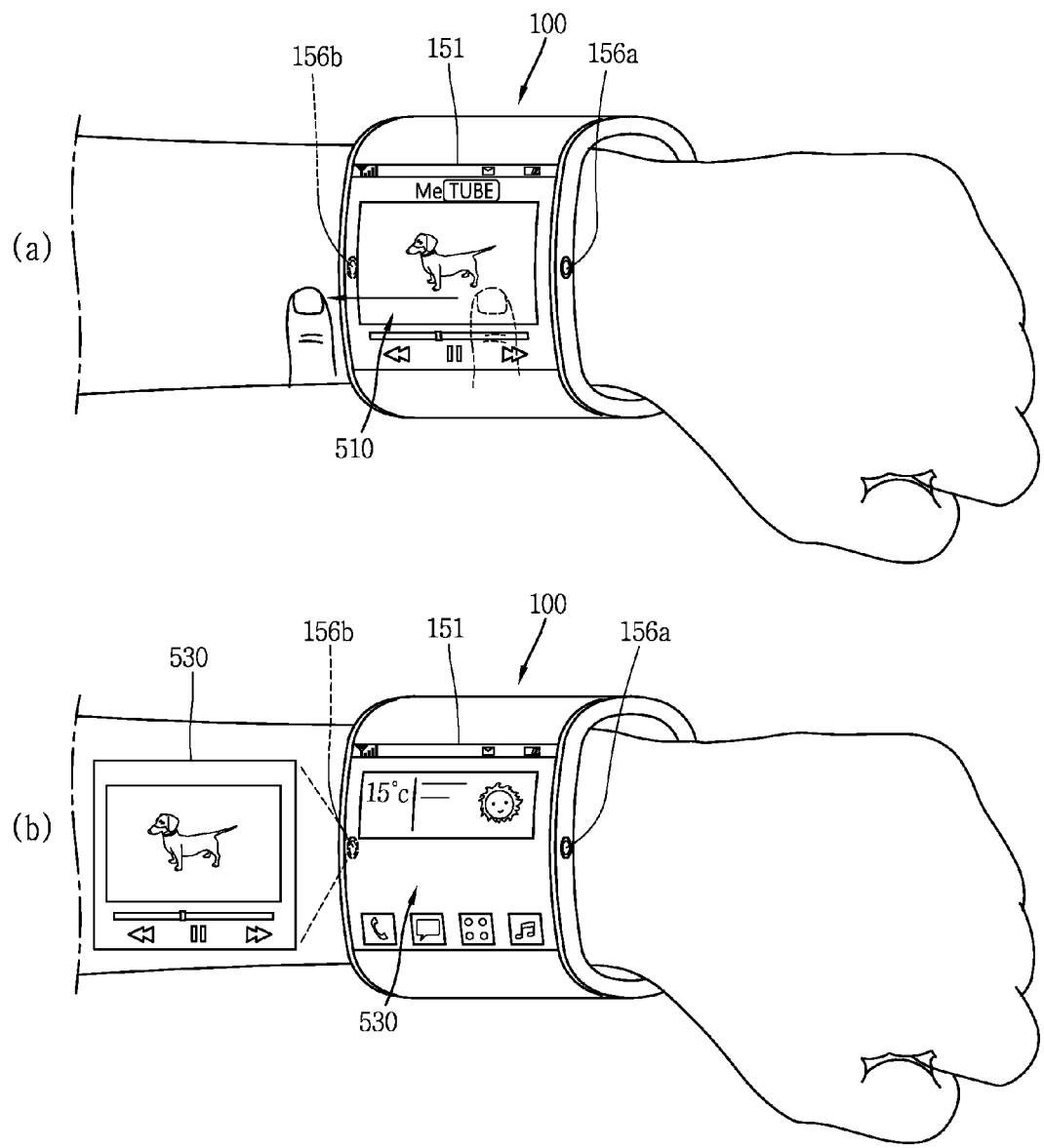

Also, as illustrated in (a) of FIG. 6C, in a state in which the first screen information 510 is output to the display unit 151, when a touch starting from one point of the display unit 151 is continuously applied toward the second projector 156b, the controller 180 may control the second projector 156b to output the screen information 530 corresponding to the first screen information therethrough as illustrated in (b) of FIG. 6C.

Figure 6D:
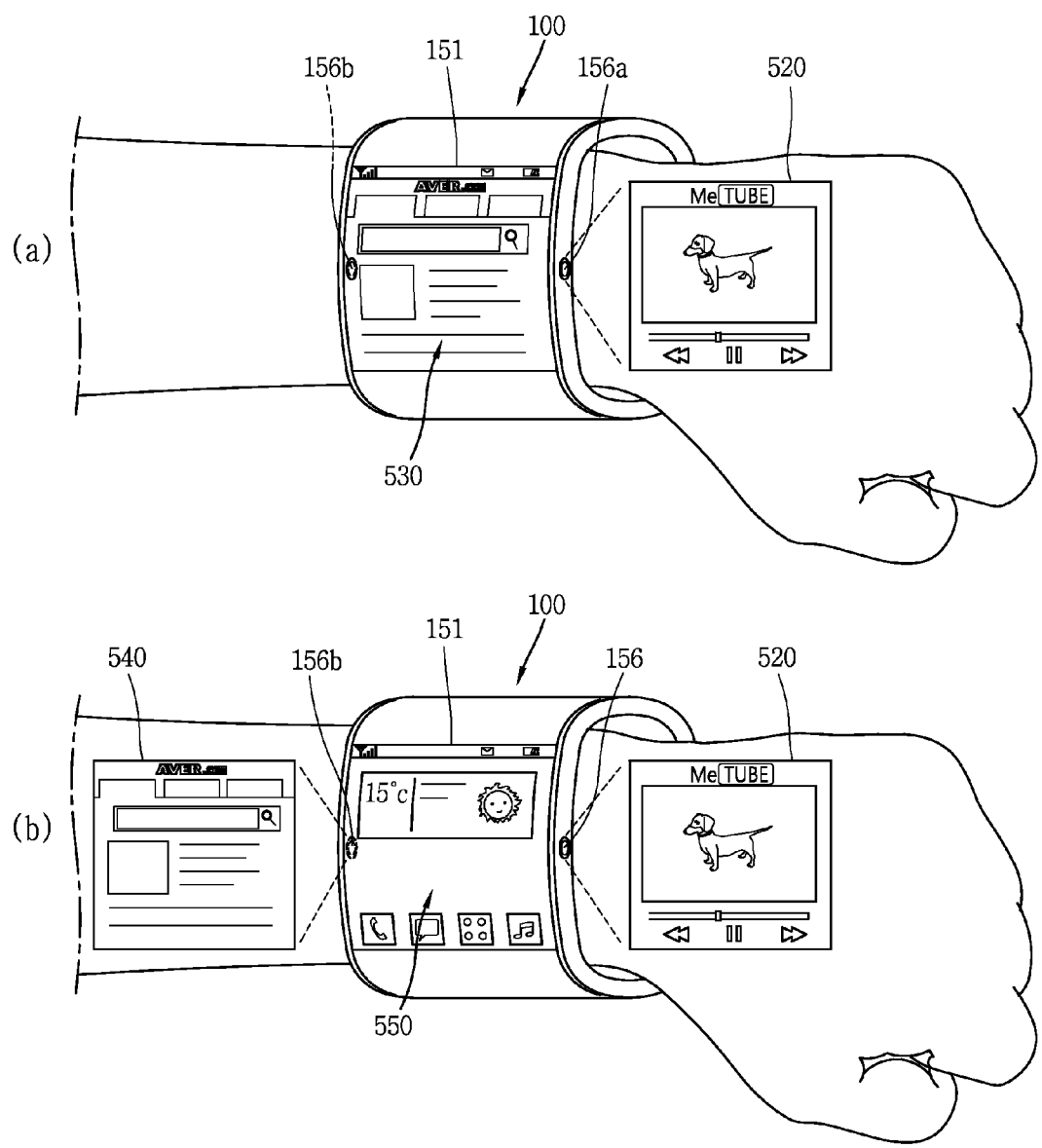
Figure 6E:
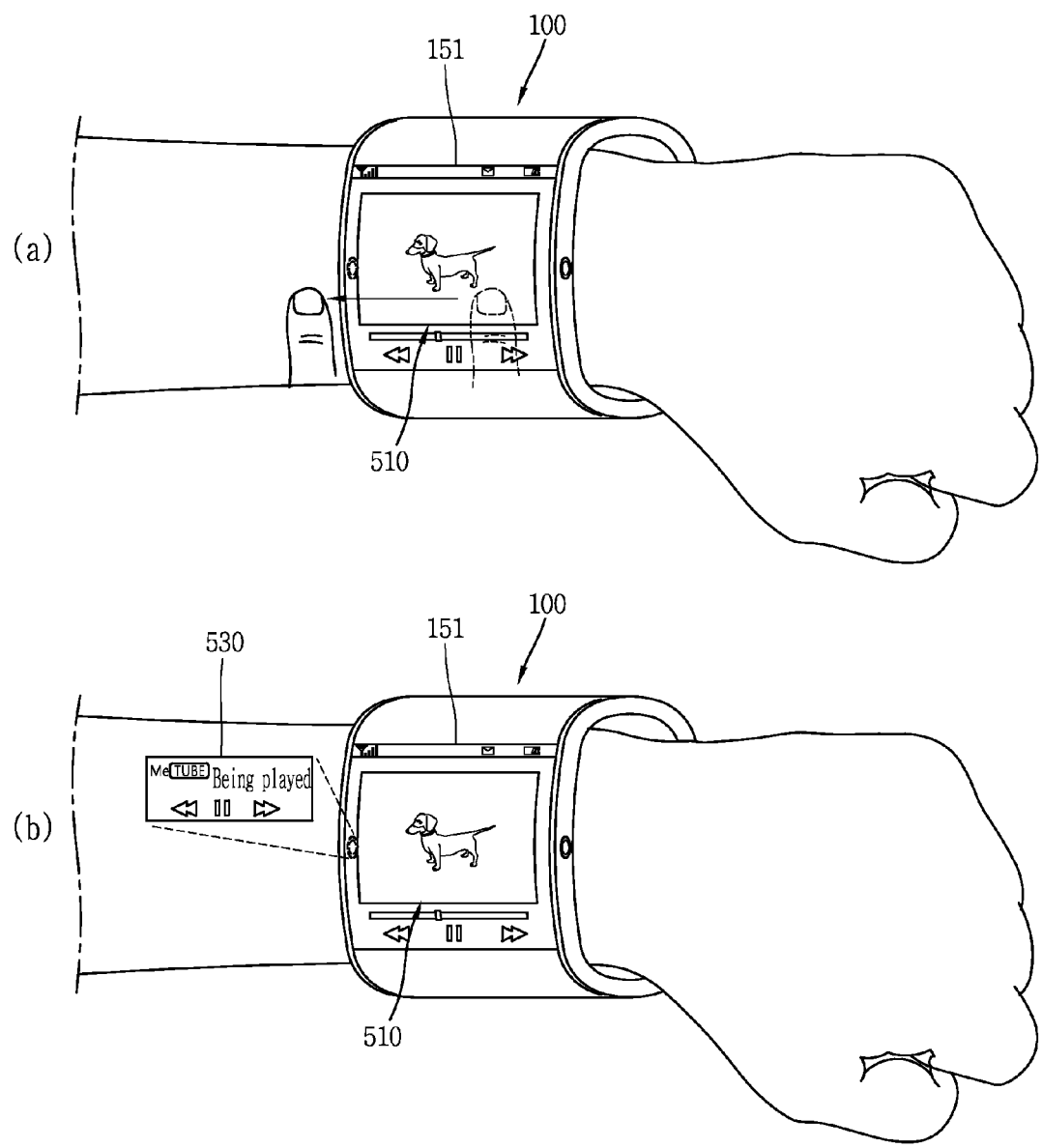

Also, as illustrated in (a) of FIG. 6D, while screen information is being displayed through the first projector 156a, when a touch inducing the second projector 156 to project screen information (or image information) therethrough is applied to the display unit 151, the controller 180 may maintain the screen information 520 projected through the first projector 156a and additionally project the screen information 530 through the second projector 156b as illustrated in (b) of FIG. 6D.

Also, although not shown, while the screen information is being displayed through the first projector 156a, when a touch inducing the first projector 156a to project screen information (or image information) therethrough is applied again to the display unit 151, the controller 180 may control the first projector 156a to project the image information related to the screen information which has been output to the display unit 151, instead of the information which has been projected through the first projection unit 156a.

Also, although not shown, while the screen information is being displayed through the first projector 156a, when a touch inducing the first projector 156a to project screen information (or image information) therethrough is applied again to the display unit 151, the controller 180 may control first projector 156a to project the image information related to the screen information which has been output to the display unit 151 together with the information which has been projected through the first projection unit 156a.

Meanwhile, the controller 180 may control a format in which screen information is displayed, differently, according to which projector among the plurality of projectors screen information is projected to.

For example, as illustrated in FIG. 6B, the first screen information itself, which has been output to the display unit 151, may be projected through the first projector 156a. When a touch inducing the second projector 156b to project screen information therethrough is applied to the display unit 151 as illustrated in (a) of FIG. 6E, the controller 180 may control the second projector 156b to project summary information 530 of the first screen information 510 which has been output to the display unit 151, therethrough.

In this manner, the controller 180 may control the projectors such that a format in which screen information related to screen information output to the display unit is changed according to a direction in which a touch is applied to the display unit 151.

Figure 6F:
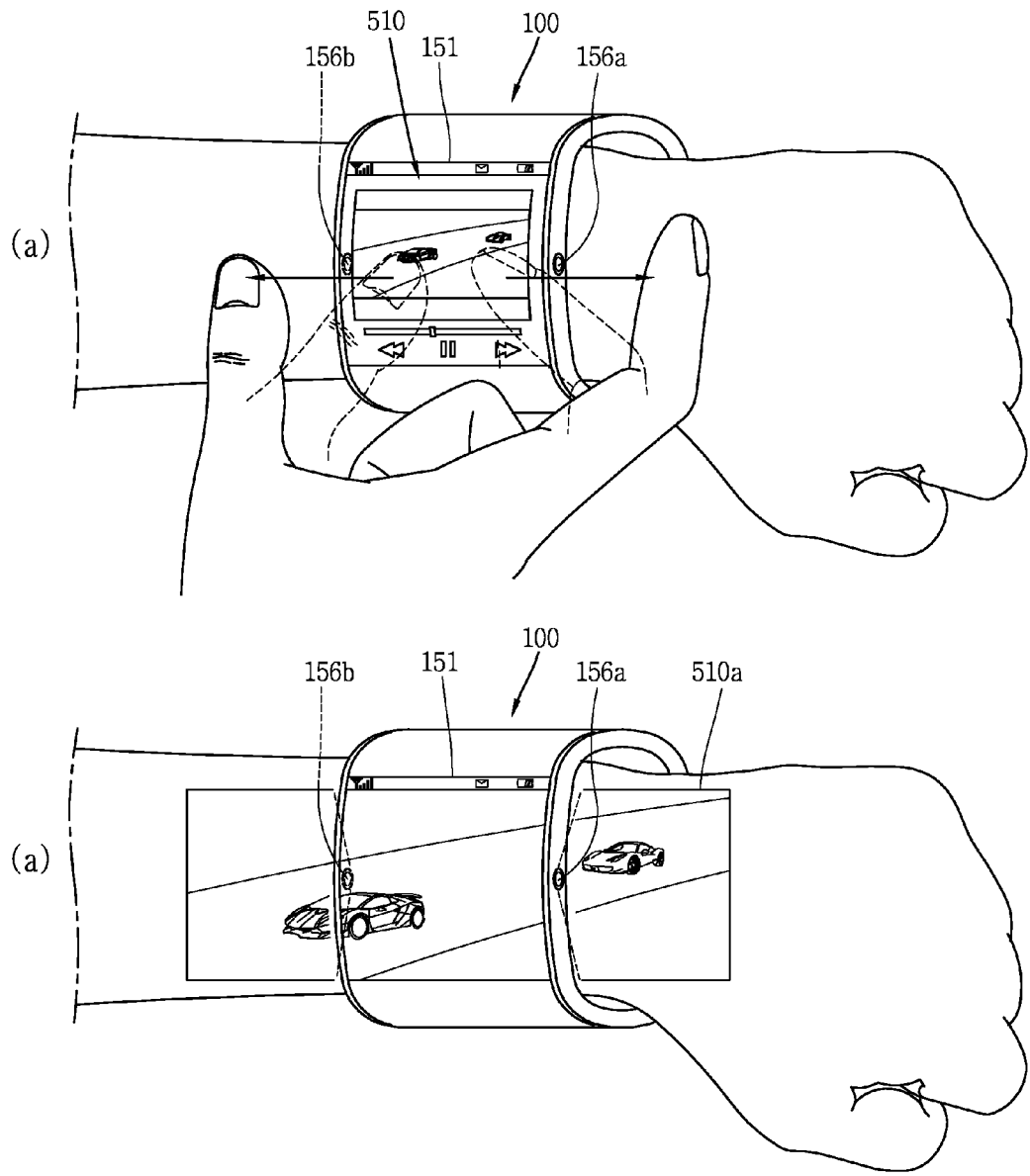

Meanwhile, in another example, in the mobile terminal according to an embodiment of the present invention, the screen information 510 output to the display unit 151 through a plurality of injectors 156a and 156b as illustrated in (a) of FIG. 6F, may be magnified and output as illustrated in (b) of FIG. 6F.

Namely, the controller 180 may display a portion of the screen information 510 on the display unit 151, and project the other portions of the screen information 510 through a plurality of projectors 156a and 156b, thus displaying the image output to the display unit 151 in a magnified manner.

As discussed above, in the mobile terminal according to an embodiment of the present invention, since which of a plurality of projectors image information is to be projected to is determined according to a direction in which a touch is applied to the display unit, the user may select a projector for projecting an image by intuition.

Figure 7A:
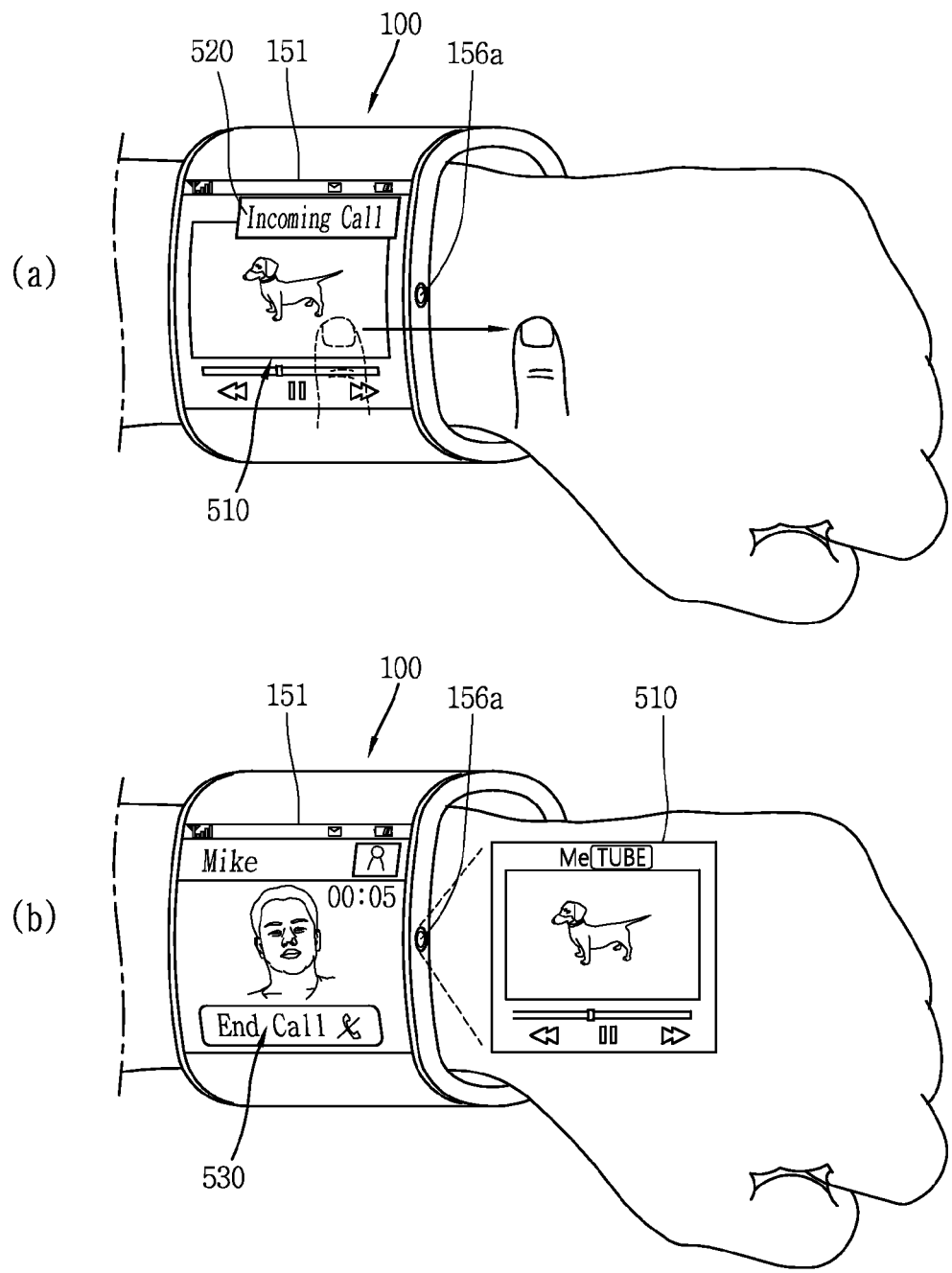
FIGS. 7A and 7B are conceptual views illustrating a method for displaying information when an event is received in the mobile terminal according to an embodiment of the present invention.
Figure 7B:
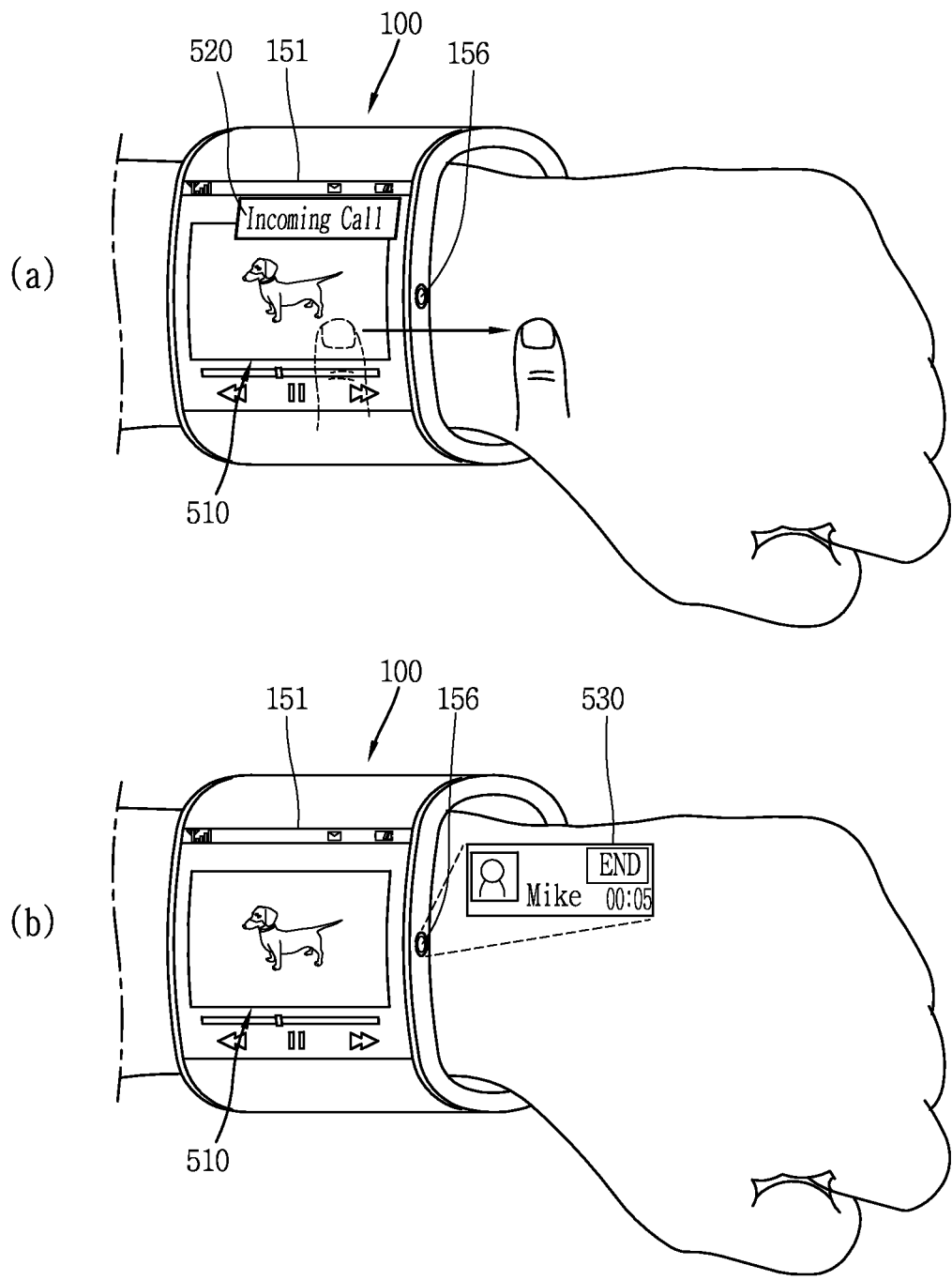

Hereinafter, a method for projecting information through a projector when an event is received will be described with reference to the accompanying drawings. FIGS. 7A and 7B are conceptual views illustrating a method for displaying information when an event is received in the mobile terminal according to an embodiment of the present invention.

First, as illustrated in (a) of FIG. 7A, in the mobile terminal according to an embodiment of the present invention, while the first screen information 510 is being displayed, when an event is received or generated, event information 520 may be output together with the first screen information 510.

Here, 'event' may refer to an occurrence of exerting influence on an operation of at least one application installed in the terminal, an occurrence of changing an item of a database (or a data file) related to the at least one application, or ah occurrence of transmitting data to an external terminal or an external network through the at least one application. For example, 'call reception', or 'message reception' may be an example of an event.

In the state in which the event information 520 is displayed together with the first screen information 510, as discussed above, when a touch corresponding to a pre-set type is applied to the display unit 151, the controller 180 may project the first screen information 510 through the projection unit 156 and output the second screen information corresponding to the event information to the display unit 151 as illustrated in (b) of FIG. 7A. Thus, the user may use the second screen information 520 related to the event and the first screen information 510, which was output to the display unit 151 before the event was received, together, through the image information output through the projection unit 156 and the display unit 151.

Meanwhile, when an event is received as illustrated in (a) of FIG. 7A, the event information 520 may be displayed in an overlapping manner with the first screen information. Also, when the first screen information 510 is projected through the projection unit 156 as illustrated in (b) of FIG. 7A, the screen information 520 corresponding to the event may be displayed on the display unit 151 on the whole.

Meanwhile, only when the touch is applied to the region in which the first screen information 510 is displayed, the controller 180 may output the first screen information (or screen information corresponding to the first screen information) which has been output to the display unit 151, through the projection unit. Namely, when the touch is applied to the region in which the event information 520 is displayed, rather than to a region in which the first screen information 510 is displayed, as illustrated in (a) of FIG. 7B, the controller 180 may project the second screen information 530 corresponding to the event through the projection unit 156 as illustrated in (b) of FIG. 7B.

As described above, in the mobile terminal according to an embodiment of the present invention, even when an event is received, event information or screen information, which has been output to the display unit may be output through the projection unit. Thus, the user may be provided with different screen information simultaneously.

Figure 8A:
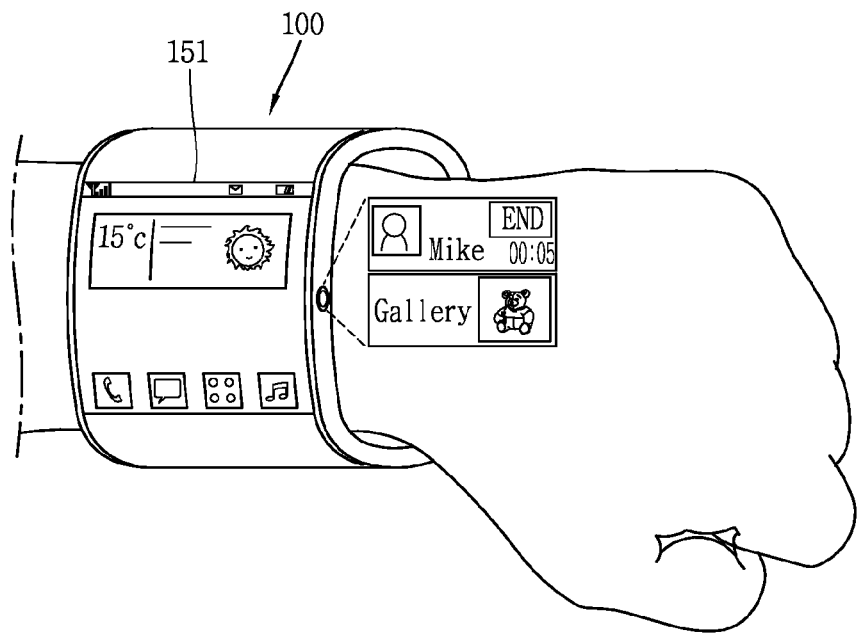
FIGS. 8A, 8B, and 8C are conceptual views illustrating a method for processing information output through the projection unit in an associated manner in the mobile terminal according to an embodiment of the present invention.
Figure 8B:
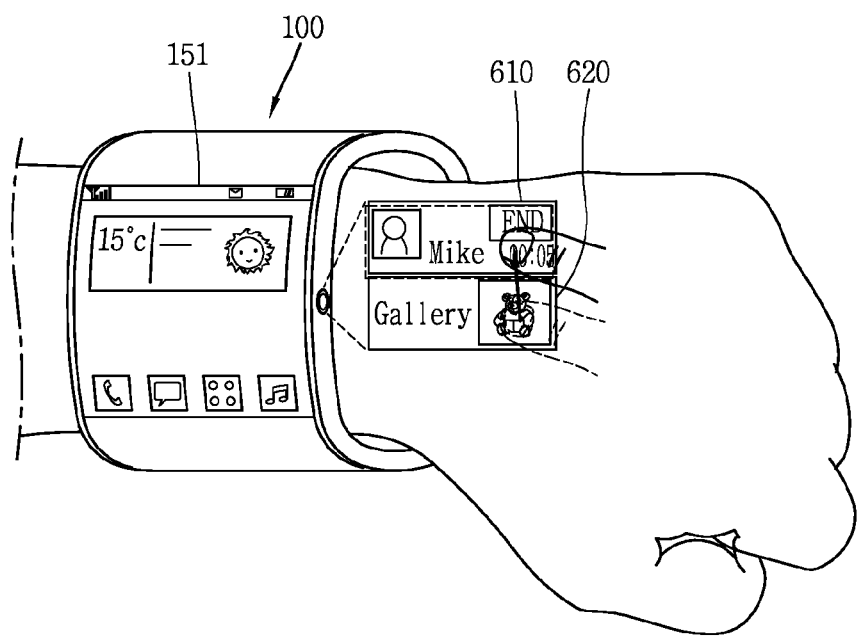
Figure 8C:
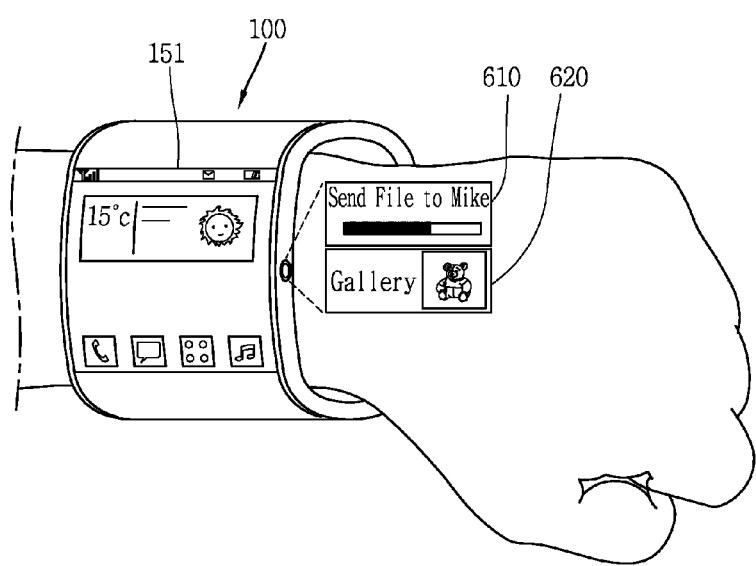

Hereinafter, a method for processing functions corresponding to a plurality of pieces of screen information output through the projection unit in an associated manner will be described in detail with reference to the accompanying drawings. FIGS. 8A, 8B, and 8C are conceptual views illustrating a method for processing information output through the projection unit in an associated manner in the mobile terminal according to an embodiment of the present invention.

In the mobile terminal according to an embodiment of the present invention, as illustrated in FIG. 8A, a plurality of pieces of screen information may be output through the projection unit 156.

For example, as illustrated in FIG. 8A, the controller 180 may output first and second screen information corresponding to different functions (or different applications). For example, the first screen information 610 may be screen information corresponding to a call function, and the second screen information 620 may be screen information corresponding to a gallery application. In this manner, in a state in which a plurality of pieces of screen information are output, when any one screen information (e.g., the second screen information 620) is moved to the other screen information (e.g., the first screen information 610) as illustrated in FIG. 8B, the controller 180 may process functions corresponding to the first screen information 610 and the second screen information 620 in an associated manner as illustrated in FIG. 8C.

For example, when the second screen information 620 corresponding to a gallery application is dragged to the screen information 610 corresponding to a call function, the controller 180 may transmit an image corresponding to the second screen information 620 to a different terminal which performs call with the mobile terminal according to an embodiment of the present invention. Namely, when the second screen information 620 is dragged to the screen information 610 corresponding to a call function, the controller 180 may transmit an image to a reception (or origination) terminal in response thereto. In this case, as illustrated in FIG. 8C, the controller 180 may control the projection unit 156 to output information regarding a state (e.g., an image transmission state) in which the associated function is performed to at least one of the first screen information 610 and the second screen information 620.

Hereinafter, a method for displaying a plurality of pieces of screen information through the projection unit will be described with reference to the accompanying drawings.

FIGS. 9A, 9B, 9C, and 9D are conceptual views illustrating a method for displaying a plurality of screen information in the mobile terminal according to an embodiment of the present invention.

In the mobile terminal according to an embodiment of the present invention, at least a portion of information output to the display unit 151 or detailed information corresponding to the at least a portion may be projected through the projection unit 156 on the basis of a user selection.

Figure 9A:
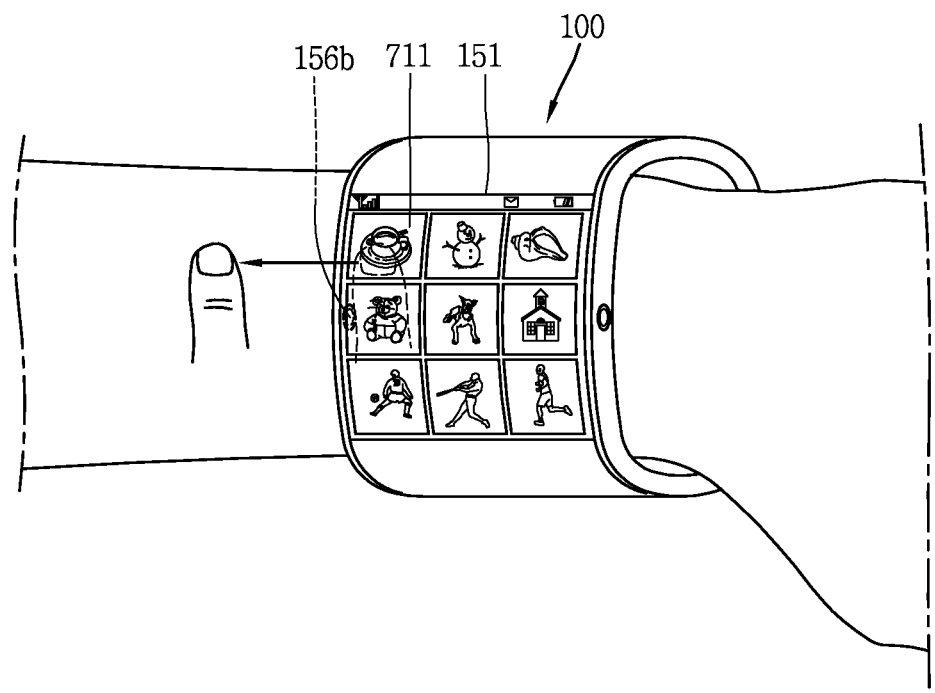
FIGS. 9A, 9B, 9C, and 9D are conceptual views illustrating a method for displaying a plurality of screen information in the mobile terminal according to an embodiment of the present invention.
Figure 9B:
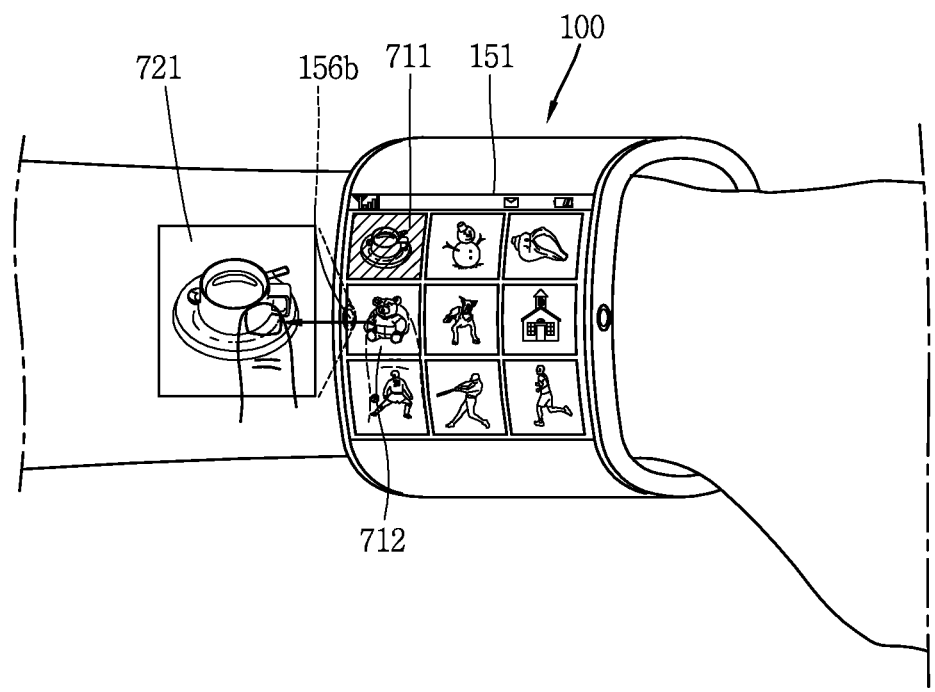

For example, as illustrated in FIG. 9A, in a state in which a plurality of thumbnails are displayed on the display unit 151 and a pre-set type touch is applied to a region in which any one 711 of the thumbnails is displayed as illustrated in FIG. 9A, the controller 180 may project an image 720 corresponding to the any one thumbnail through the projection unit 156 as illustrated in FIG. 9B. Thus, the user may use a plurality of thumbnails through the display unit 151 and may minutely check an image regarding at least one of the plurality of thumbnails through projection by the projection unit 156 as necessary.

Figure 9C:
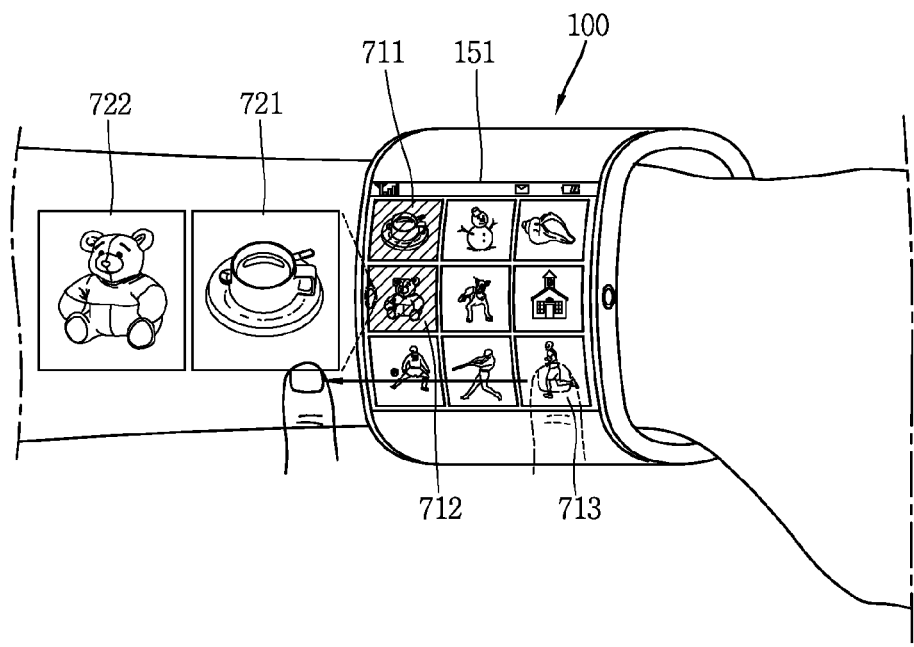
Figure 9D:
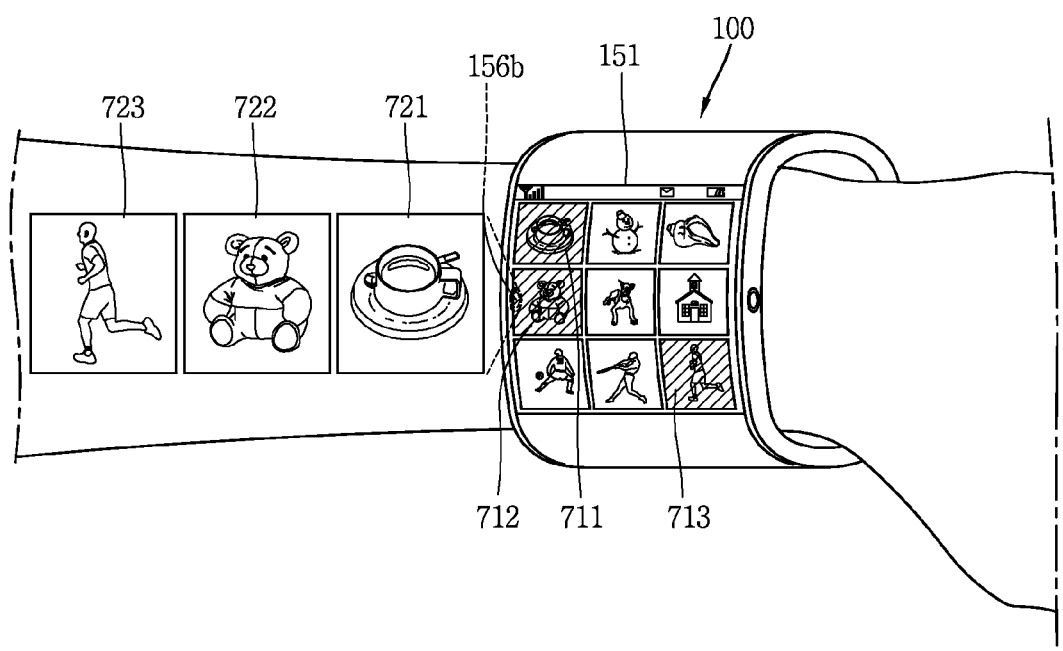

Meanwhile, as illustrated in FIGS. 9B, 9C, and 9D, on the basis of a pre-set type touch applied to different thumbnails output to the display unit 151, the controller 180 may project images corresponding to the thumbnails, respectively. Thus, as illustrated in FIGS. 9C and 9D, a plurality of images 721, 722, and 723 may be sequentially displayed on the user's wrist. Meanwhile, order in which the plurality of images 721, 722, and 723 are disposed may be dependent upon order in which the touches are applied. Also, disposition order of the images 721, 722, and 723 projected through the projection unit 156 may be changed on the basis of the user selection.

Hereinafter, a method of terminating image information by the projection unit on the basis of a user's gesture will be described in detail with reference to the accompanying drawings. FIGS. 10A, 10B, 10C, and 10D are conceptual views illustrating a method for controlling information output through the projection unit in the mobile terminal according to an embodiment of the present invention.

Figure 10A:
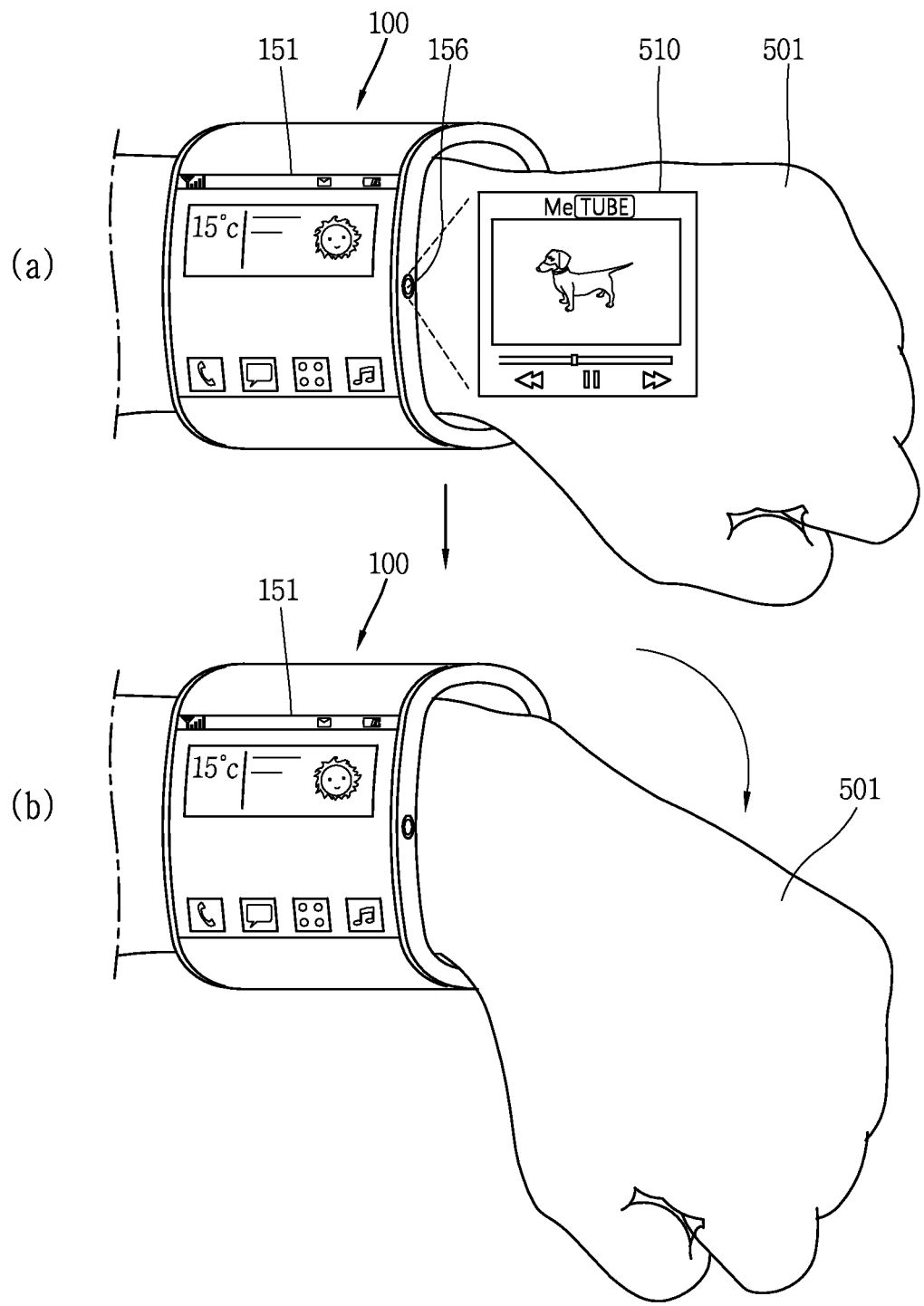
FIGS. 10A, 10B, 10C, and 10D are conceptual views illustrating a method for controlling information output through the projection unit in the mobile terminal according to an embodiment of the present invention.

In the mobile terminal according to an embodiment of the present invention, in a state in which the screen information 510 is projected to the back of the user's hand or the user's wrist through the projection unit 156 as illustrated in (a) of FIG. 10A, when a pre-set gesture that the back of the user's hand moves downwardly is sensed, the projection of the screen information 510 may be terminated.

In the mobile terminal according to an embodiment of the present invention, the sensing unit 140 is disposed on the surface of the body 100 in contact with the user's wrist, and thus, movements of a plurality of tendons passing through the user's wrist may be sensed by the sensing unit 140. In this case, the sensing unit 140 may serve as a detection unit detecting a movement of the user's fingers or wrist. Namely, the sensing unit 140 may sense movements of tendons according to movements of fingers, and transfer the sensed information to the controller 180. Also, the controller 180 may process a function matched to the movements of the fingers or the wrist on the basis of the sensed information from the sensing unit 140.

Meanwhile, movements of tendons according to movements of fingers will be described. Finger flexor tendons administering movements of fingers exist in a carpal tunnel within the wrist. Nine tendons and one nerve exist in the finger flexor tendons, and when fingers move, the nine tendons included in the finger flexor tendons are moved in various combinations. The sensing unit 140 may sense a shape of the tendons deformed according to the movement of the fingers or the wrist, and the controller 180 may determine gestures of the fingers on the basis of the sensed information.

Thus, when the movements of the fingers or the wrist correspond to a pre-set gesture through the sensing unit 140, the controller 180 may execute a function matched to the per-set gesture. Namely, as illustrated in FIG. 10A, when a 'projection termination function' is matched to a 'gesture of bending the wrist', the controller 180 may execute a function corresponding to the 'gesture of bending the wrist'. Meanwhile, the 'gesture of bending the wrist' is merely an example, and various gestures may correspond to the 'projection termination function'.

Figure 10B:
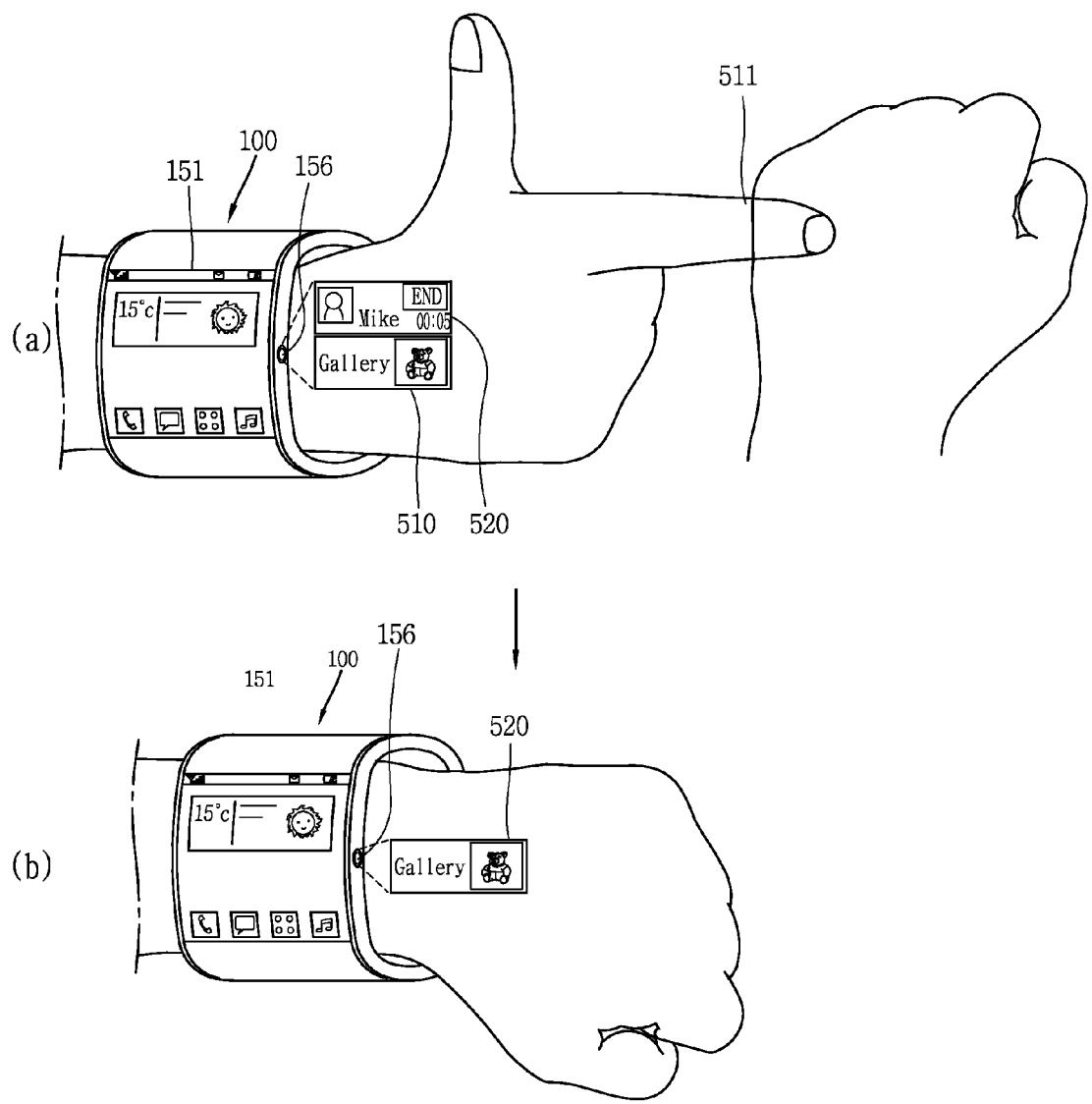

Meanwhile, as illustrated in (a) of FIG. 10B, in a state in which the plurality of pieces of screen information 510 and 520 are projected, when an impact is applied to a finger 511 corresponding to the region in which the plurality of pieces of screen information 510 and 520 are displayed as illustrated in (a) of FIG. 10B, the projection of the screen information 510 displayed in the position corresponding to the finger 511 to which the impact was applied may be terminated as illustrated in (b) of FIG. 10B. Meanwhile, whether the impact has been applied to the finger 511 may be sensed by the sensing unit 140 as described above.

Figure 10C:
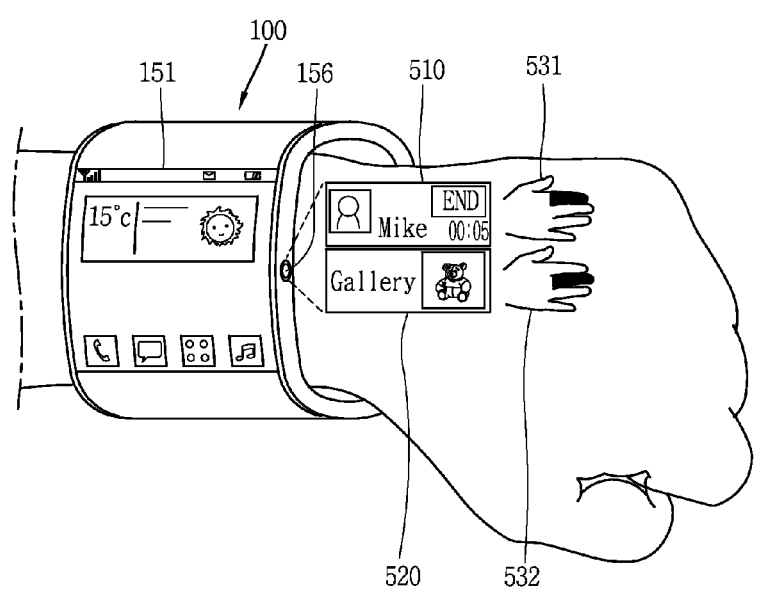

Also, in the mobile terminal according to an embodiment of the present invention, when an impact is applied to a certain finger, pieces of guide information 531 and 532 may also be output together as illustrated in FIG. 10C in order to provide information regarding projection to which screen information has been terminated.

Figure 10D:
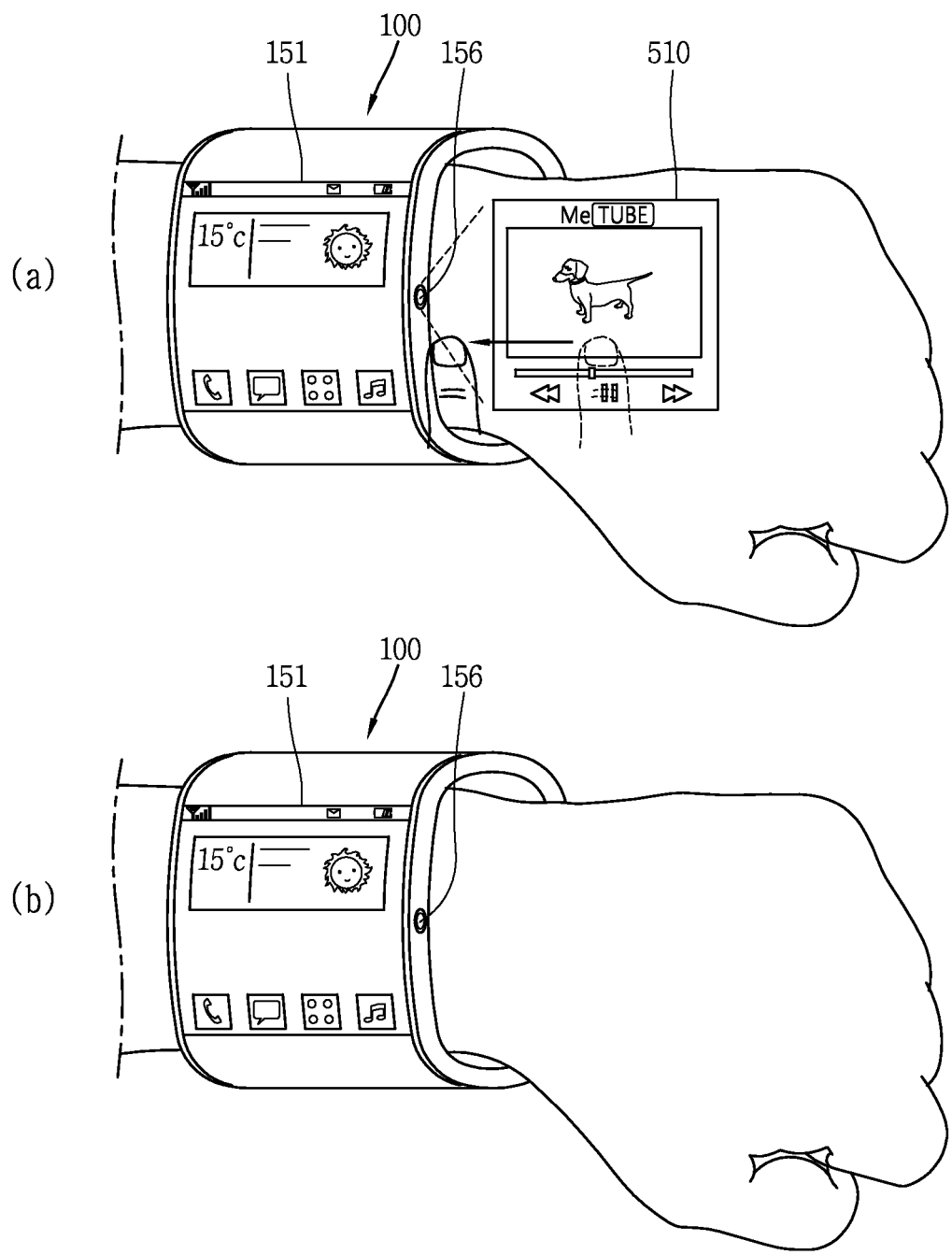

Meanwhile, in the mobile terminal according to an embodiment of the present invention, when a touch applied to a point of the projected screen information 510 corresponds to a pre-set type as illustrated in (a) of FIG. 10D, the controller 180 may terminate the projection of the screen information 510 as illustrated in (b) of FIG. 10D. Here, the pre-set type touch may be a drag touch which, starting from one point of the projected screen information 510, moves toward the body 100 of the mobile terminal.

As described above, in the mobile terminal according to an embodiment of the present invention, since projected screen information is controlled through an intuitive gesture using the user's wrist or fingers, user convenience can be enhanced.

Hereinafter, a method for transmitting information through a gesture will be described in detail with reference to the accompanying drawings. FIGS. 11A, 11B, 12A, 12B, and 12C are conceptual views illustrating a method for transmitting information in the mobile terminal according to an embodiment of the present invention.

In the mobile terminal according to an embodiment of the present invention, when a gesture of the user's finger or wrist corresponds to a pre-set movement, data corresponding to projected screen information may be transmitted to at least one external terminal or at least one external server. Meanwhile, there may be various methods for specifying an external terminal or an external server for receiving the data, and detailed descriptions thereof in the present disclosure will be omitted.

Figure 11A:
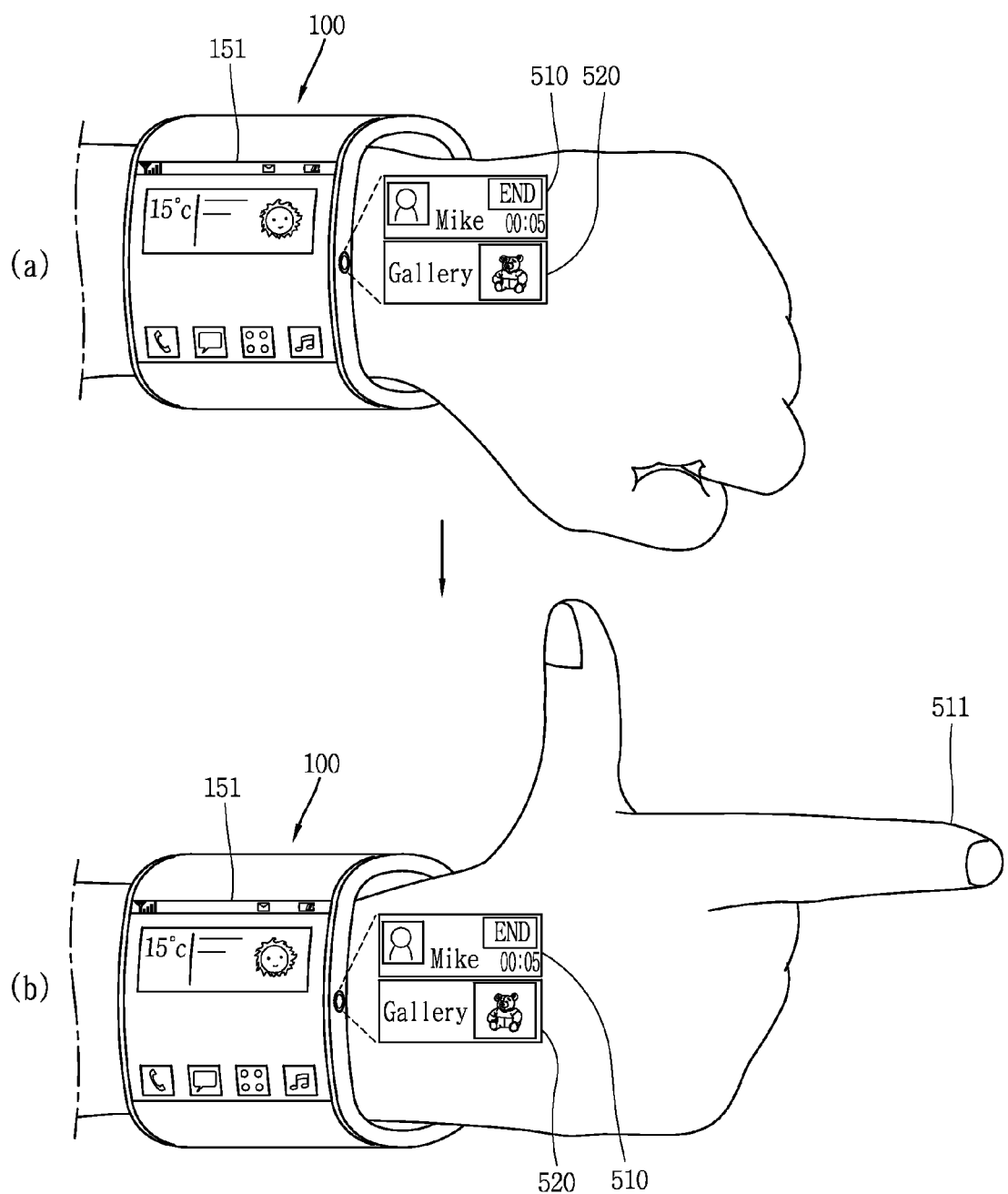
FIGS. 11A, 11B, 12A, 12B, and 12C are conceptual views illustrating a method for transmitting information in the mobile terminal according to an embodiment of the present invention.

For example, in a state in which pieces of screen information 510 and 520 are projected to the user's wrist or fingers as illustrated in (a) of FIG. 11A, when any one finger 511 is spread out as illustrated in (b) of FIG. 11A, the controller 180 may transmit the screen information 510 displayed in a position corresponding to the spread finger to at least one pre-set external terminal or external server.

Meanwhile, whether the finger 511 is spread out may be sensed by the sensing unit 140 as described above.

Figure 11B:
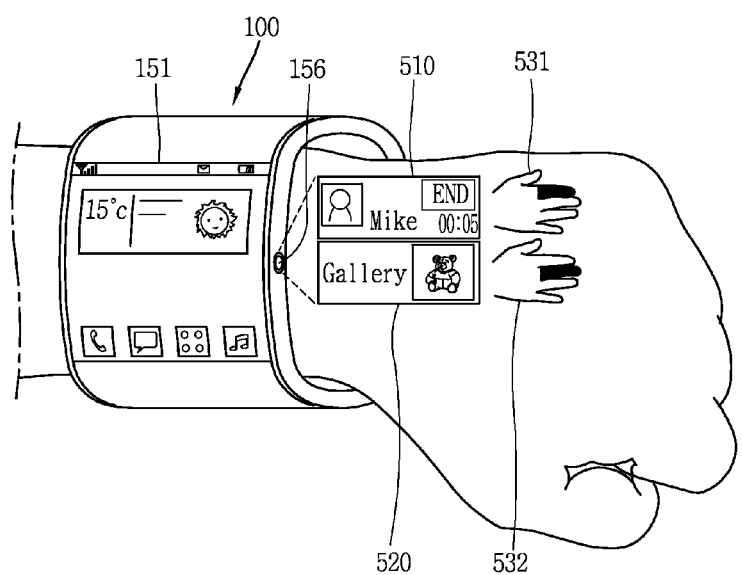

Also, in the mobile terminal according to an embodiment of the present invention, in a case in which an impact is applied to a certain finger, pieces of guide information 531 and 532 as illustrated in FIG. 11B may be output together in order to provide information regarding projection to which screen information has been terminated.

Also, in the mobile terminal according to an embodiment of the present invention, on the basis of recognition of a biomedical signal, data corresponding to at least one of projected screen information or screen information output to the display unit 151 may be transmitted to a counterpart mobile terminal according to the recognized biomedical signal.

Figure 12A:
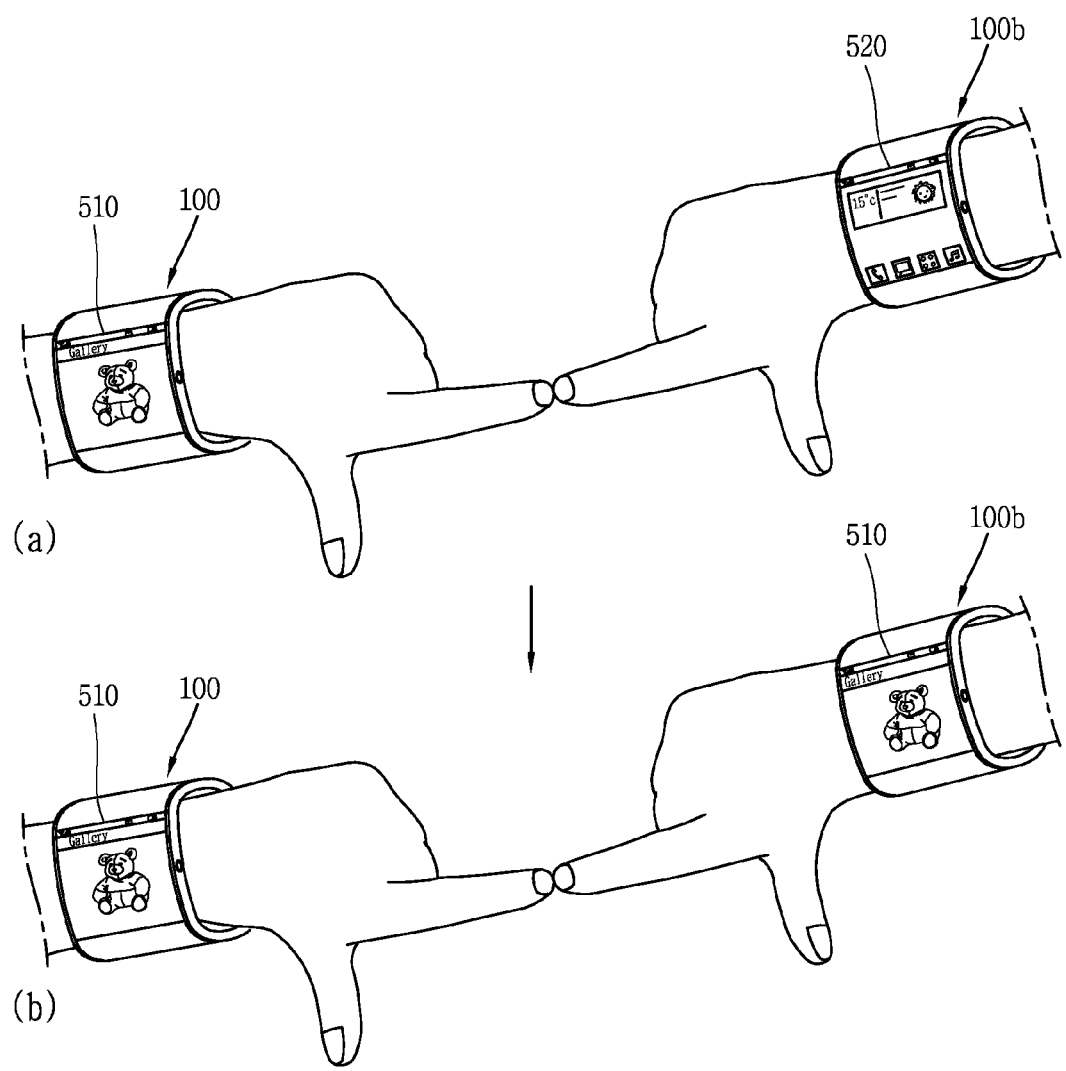

Namely, as illustrated in FIG. 12A, when the user's finger of the mobile terminal 100 according to an embodiment of the present invention comes into contact with a different user's finger, the mobile terminal 100 according to an embodiment of the present invention may receive a biometric signal on the basis of the contact. The controller 180 may recognize the received biometric signal as a control command of "transmitting data corresponding to at least one of the screen information output to the display unit 151 or the projected screen information". Thus, as illustrated in (b) of FIG. 12A, the controller 180 may transmit data corresponding to at least one of the screen information projected to a mobile terminal 100a or screen information output to the display unit 151 to a mobile terminal 100b of the different user which has caused the generation of the biometric signal.

Meanwhile, in the mobile terminal according to an embodiment of the present invention, when the biometric signal is received and a pre-set type touch is applied to the display unit 151 in addition thereto, data corresponding to at least one of the projected screen information and the screen information output to the display unit 151 may be transmitted.

Figure 12B:
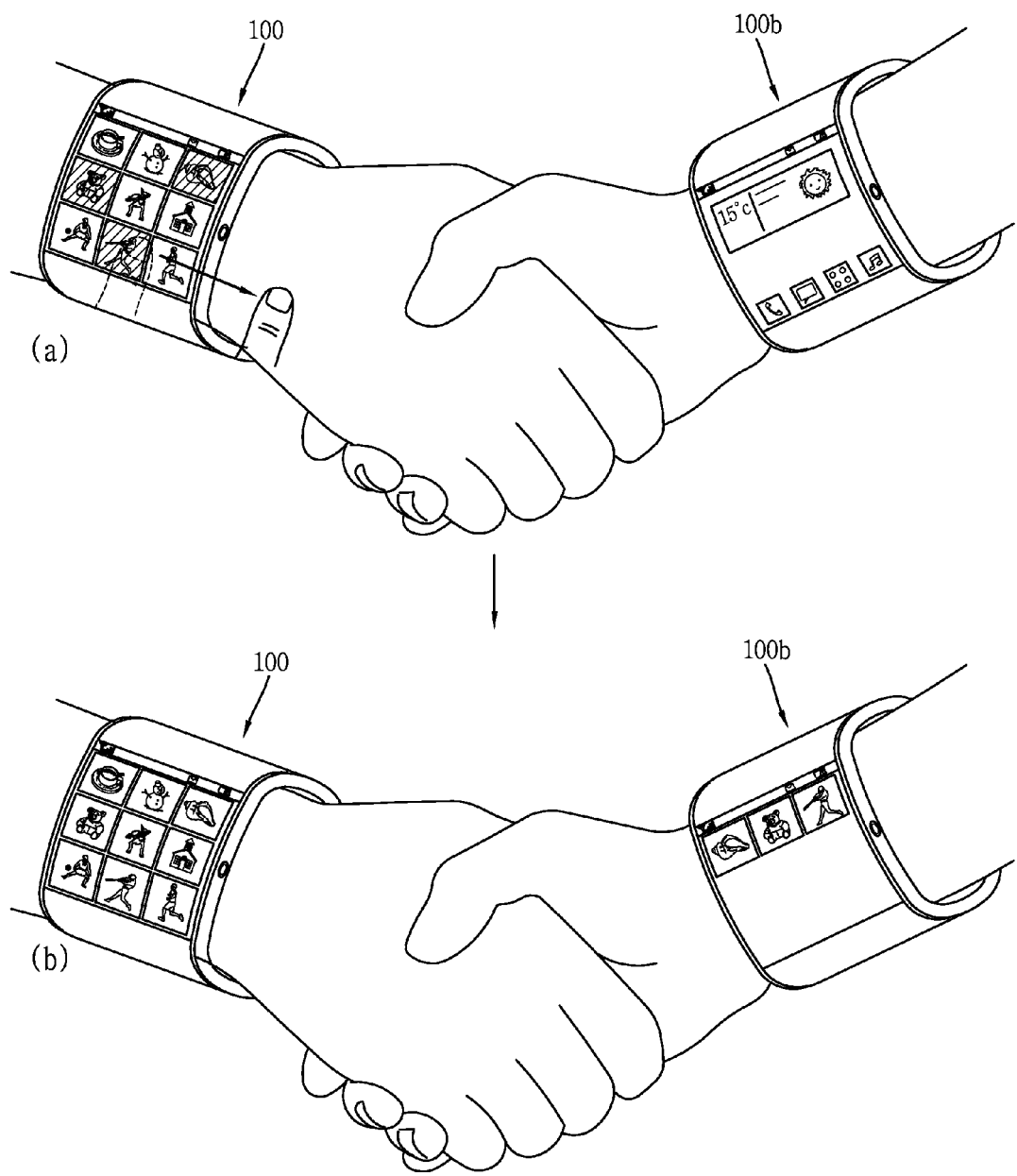
Figure 12C:
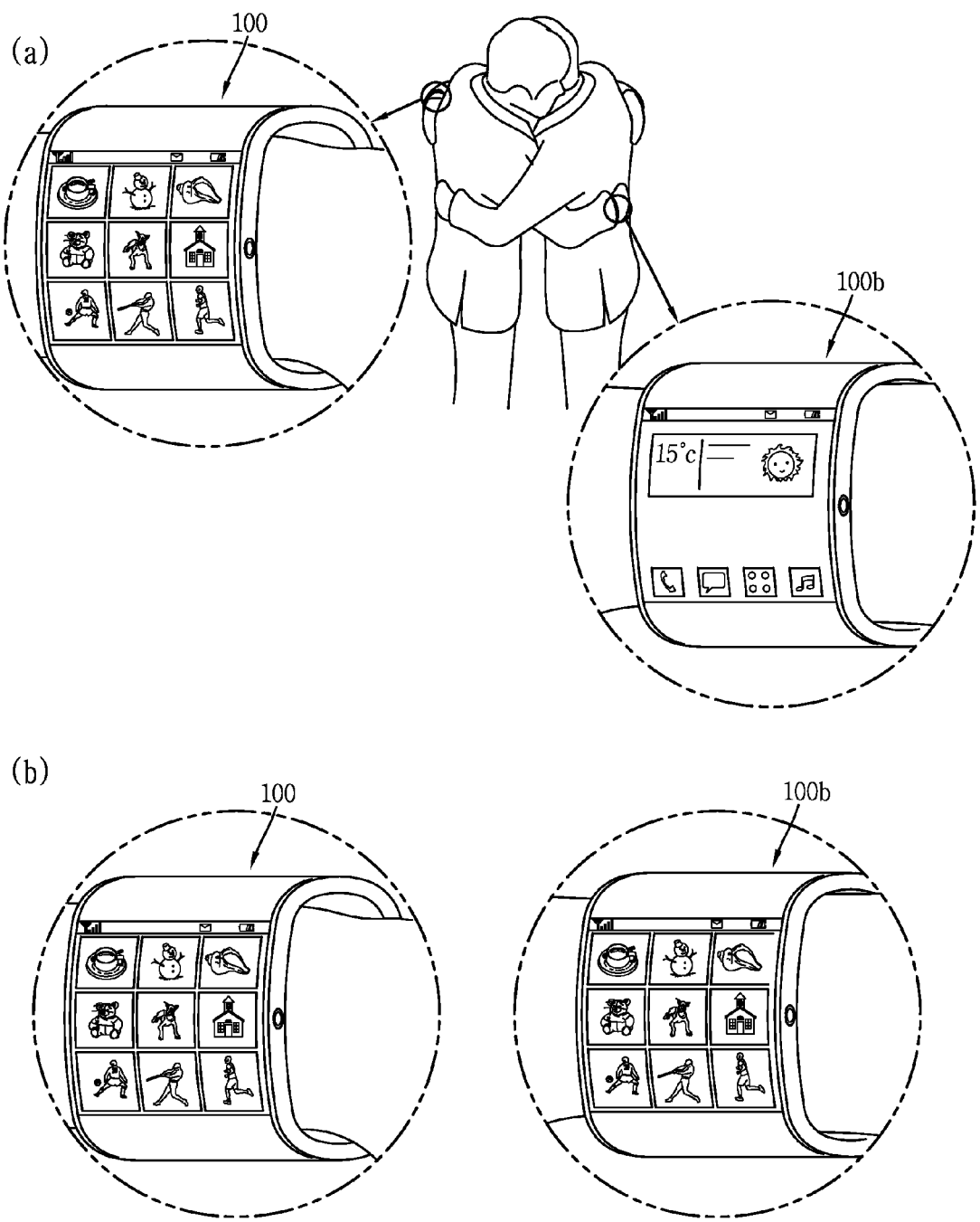

Meanwhile, in the mobile terminal according to an embodiment of the present invention, a degree to which data is transmitted may vary according to a degree to which the user comes into contact with a different user. Namely, the controller 180 may control the wireless communication unit 110 such that an amount of data transmission differs according to a degree of a received biometric signal. For example, in a case in which the user shakes hands with a different user as illustrated in FIG. 12B and in a case in which the user embraces a different user as illustrated in FIG. 12C, amounts of transmitted data may differ. Namely, when the user shakes hands with a different user as illustrated in FIG. 12B, three image data may be transmitted, and when the user embraces a different user as illustrated in FIG. 12C, nine image data may be transmitted.

Meanwhile, in the mobile terminal according to an embodiment of the present invention, in a case in which the user shakes hands with another user and the hands which are shaken move to correspond to at least one of a pre-set number of times and a pre-set speed, namely, only when the hands are shaken, data may be transmitted.

As described above, in the mobile terminal according to an embodiment of the present invention, since a control command for data transmission is generated in an intuitive manner, like a gesture using the user's wrist or fingers or a biometric signal, user convenience can be enhanced.

Hereinafter, a method for receiving information from a user through a virtual key projected through infrared ray (IR) will be described in detail with reference to the accompanying drawings. FIGS. 13A, 13B, 13C, and 13D are conceptual views illustrating a method for outputting a virtual keyboard in the mobile terminal according to an embodiment of the present invention.

In the mobile terminal according to an embodiment of the present invention, as described above, the projection unit may include a light source device, an image formation module, and a lens. Here, the light source device emits light, and the image formation module may form image information (or screen information) by using light.

In addition, in the present embodiment, in particular, the projection unit may include a laser diode, and the laser diode may be configured as a red laser diode, in particular.

Figure 13A:
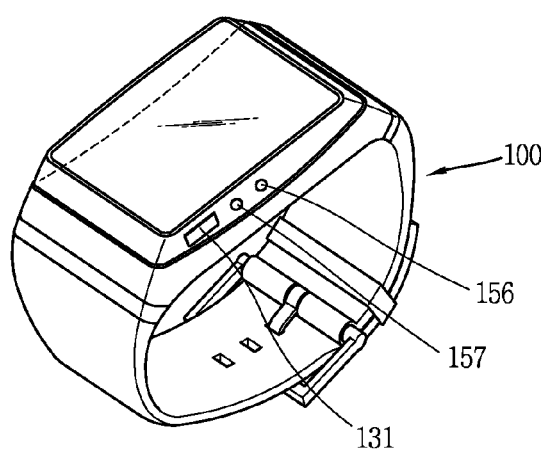
FIGS. 13A, 13B, 13C, and 13D are conceptual views illustrating a method for outputting a virtual keyboard in the mobile terminal according to an embodiment of the present invention.
Figure 13B:
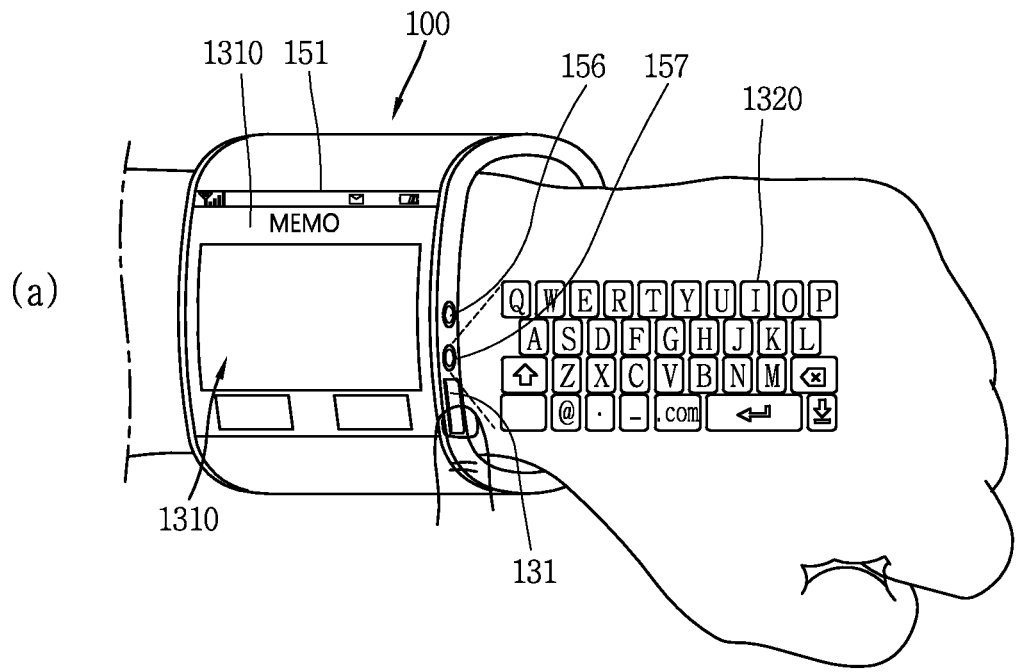
Figure 13B:
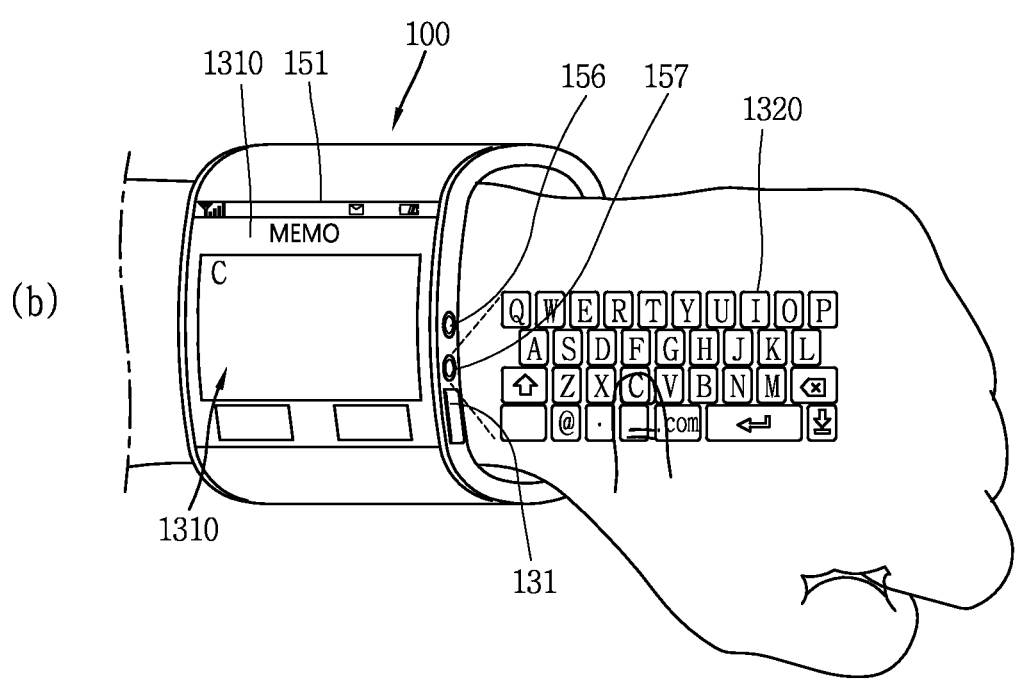

As illustrated in FIG. 13A, the mobile terminal according to an embodiment of the present invention may include both a first transaction unit 156 for outputting an image and a second projection unit 157 configured as a laser diode. Also, although not shown, the mobile terminal according to an embodiment of the present invention may include only the second projection unit 157, without the first projection unit 156 for outputting an image.

In the controller 180 according to an embodiment of the present invention, a virtual keyboard may be output to the back 501 of the user's hand, the user's wrist, or any other object by using light projected from the second projection unit 157, e.g., by using visible light.

Meanwhile, in the mobile terminal according to an embodiment of the present invention, in a state in which the second projection unit 157 is activated, the second projection unit 157 may be controlled to output a virtual keyboard all the time. To this end, in the mobile terminal according to an embodiment of the present invention, a user input unit 131 for activating the second projection unit 157 may be separately provided. The user input unit 131 may be configured as a physical button or may be configured as a touch pad. Meanwhile, although not shown, in the mobile terminal according to an embodiment of the present invention, although the user input unit 131 for activating the second projection unit 157 is not separately provided, the second projection unit 157 may be activated through a touch input applied to the display unit 151. Also, in the mobile terminal according to an embodiment of the present invention, although the user input unit 131 for activating the second projection unit 157 is separately provided, the second projection unit 157 may be activated through a touch input applied to the display unit 151.

An embodiment in which the user input unit 131 is provided will be described. When the user input unit 131 is pressed or touched by the user as illustrated in (a) of FIG. 13B, the controller 180 may output a virtual keyboard 1320 as illustrated in (b) of FIG. 13B. In addition, as illustrated in (b) of FIG. 13B, when a proximity or adjacent touch is applied to the virtual keyboard 13230, the controller 180 may determine that a letter corresponding to a key output to the touch-applied region is selected. For example, the controller 180 may determine which key among a plurality of keys included in the virtual keyboard 1320 has been selected by using an infrared sensor (not shown).

Meanwhile, the selected letter may be output to the display unit 151 as illustrated. Thus, the user may be able to input information by using the virtual keyboard 1320, rather than inputting information by using the display unit 151. In this manner, in the mobile terminal according to an embodiment of the present invention, the drawbacks of the watch-type mobile terminal including the display unit 151 having a limited size can be overcome.

Figure 13C:
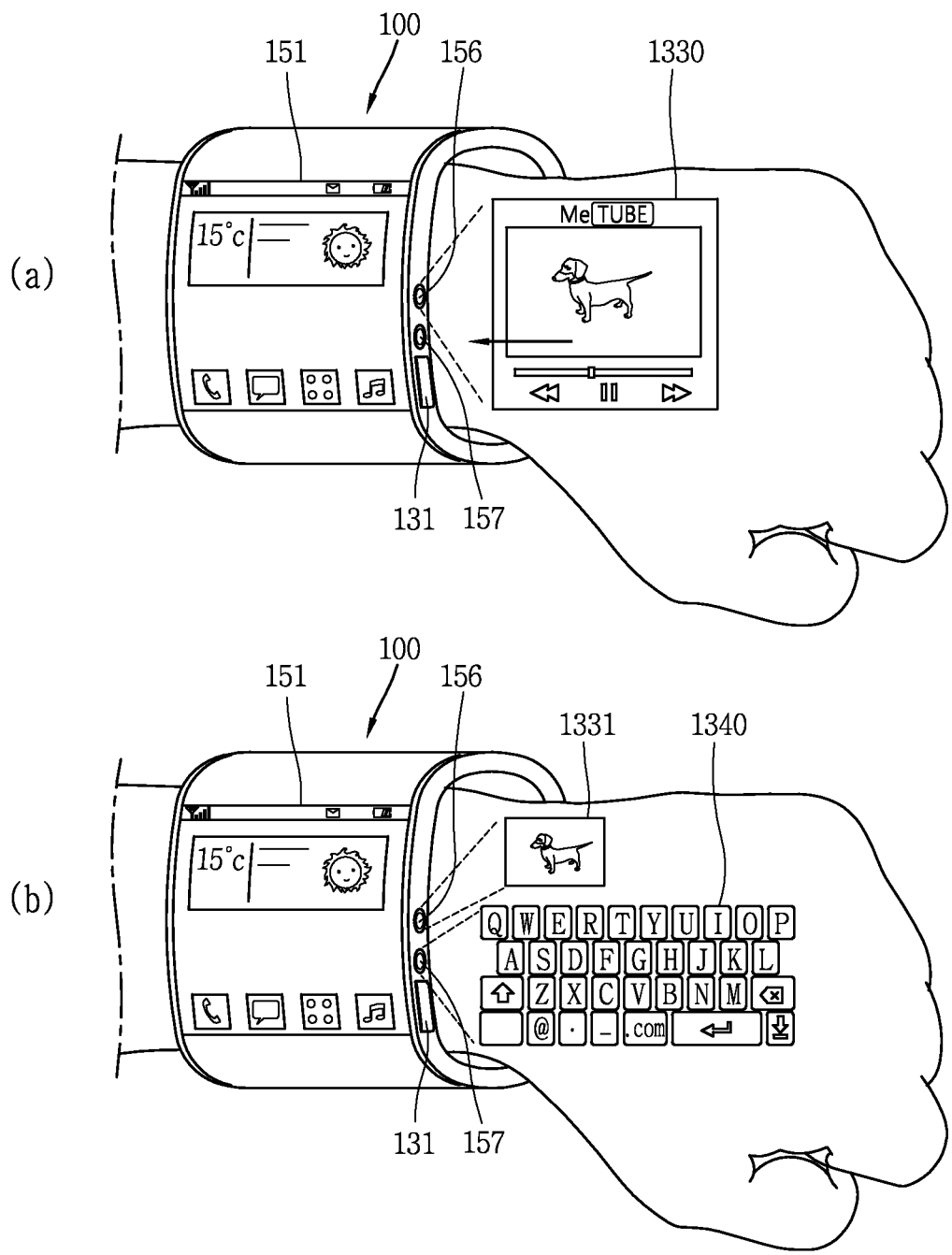

Meanwhile, in the mobile terminal according to an embodiment of the present invention, while screen information 1330 is being projected through the first projection unit 156 as illustrated in (a) of FIG. 13C, when a control command for activating the second projection unit 157 is generated, the screen information 1330 projected through the first projection unit 156 may be reduced and reduced screen information 1331 may be output so that the user may use both images projected through the first and second projection units 156 and 157. The educed screen information 1331 may be screen information obtained by scaling down the screen information 1330 before being reduced, or may be summary information of the screen information 1330. Here, the summary information may be information representing the screen information 1330 before being reduced.

Meanwhile, when a space to which an image is to be projected is secured, the controller 180 may not reduce the screen information which has been projected through the first projection unit 156. Namely, the controller 180 may determine whether to reduce the screen information projected through the first projection unit 156, or a degree of reduction of the screen information according to a size of the space in which the image is projected.

Also, the controller 180 may adjust a size of the virtual keyboard output through the second projection unit 157 according to a size of a space in which an image is to be projected.

Figure 13D:
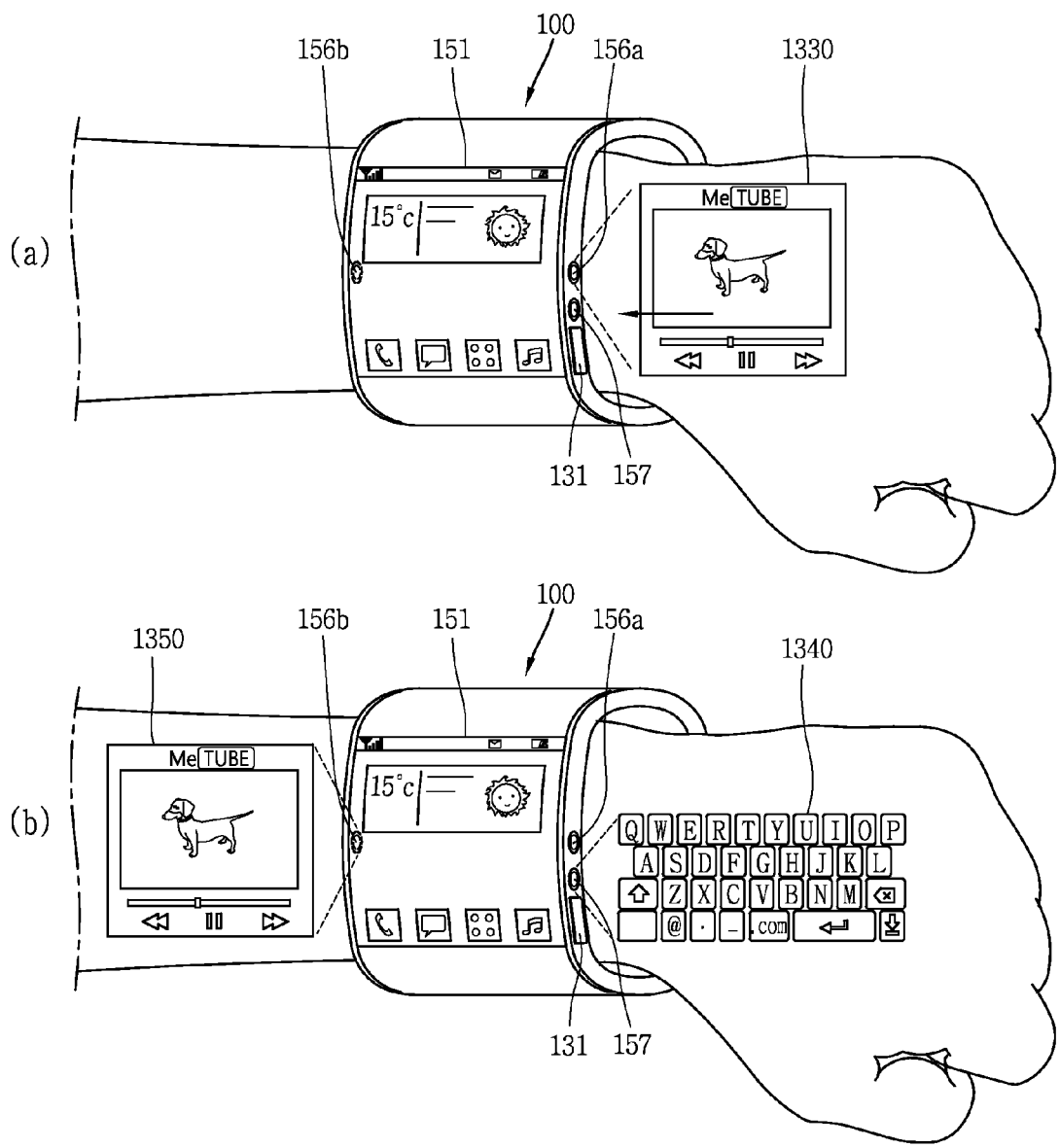

Meanwhile, in the mobile terminal according to an embodiment of the present invention, while the screen information 1330 is being projected through the first projection unit 156a as illustrated in (a) of FIG. 13D, when a control command for activating the second projection unit 157 is generated, projecting of the screen information 1330 through the first projection unit 156a disposed in the same direction as that of the second projection unit 157 may be stopped and screen information 1350 may be projected through a third projection unit 156b disposed in a direction different from that of the second projection unit 157.

As described above, in the mobile terminal according to an embodiment of the present invention, since a virtual keyboard is output through the projection unit, the drawbacks of the watch-type mobile terminal including the display unit 151 having a limited size can be overcome.

Also, in the mobile terminal according to an embodiment of the present invention, the projection unit is provided in addition to the display unit provided in the body and information can be output to the user's wrist or the back of the user's band through the projection unit. Thus, the user may be provided with various, a large amount of screen information through the display unit and the projection unit.

Also, in the mobile terminal according to an embodiment of the present invention, a state of information output from the display unit or the projection unit may be changed on the basis of a gesture such as a movement of the user's wrist. Thus, the user can control information output through the mobile terminal by intuition, and as a result, user convenience can be enhanced.

In the embodiments of the present invention, the foregoing method may be implemented as codes that can be read by a processor in a program-recorded medium. The processor-readable medium may include any types of recording devices in which data that can be read by a computer system is stored. The processor-readable medium may include a ROM, a RAM, a CD-ROM, a magnetic tape, a floppy disk, an optical data storage device, and the like. The processor-readable medium also includes implementations in the form of carrier waves or signals (e.g., transmission via the Internet).

The mobile terminal according to the embodiments of the present disclosure is not limited in its application of the configurations and methods, but the entirety or a portion of the embodiments can be selectively combined to be configured into various modifications.

As the exemplary embodiments may be implemented in several forms without departing from the characteristics thereof, it should also be understood that the above-described embodiments are not limited by any of the details of the foregoing description, unless otherwise specified, but rather should be construed broadly within its scope as defined in the appended claims. Therefore, various changes and modifications that fall within the scope of the claims, or equivalents of such scope are therefore intended to be embraced by the appended claims.

What is claimed is:

1. A mobile terminal comprising:
a body formed to wrap around at least one region of a user's wrist;
a projection unit disposed to the side of the body;
a touch screen disposed on a front surface of the body and configured to output first screen information; and
a controller configured to:
control the projection unit to project visual information corresponding to the first screen information currently displayed on the touch screen, on the basis of a pre-set type touch applied to the touch screen,
wherein the projection unit includes a plurality of projectors, and
the visual information corresponding to the first screen information is projected through a projector placed in a position corresponding to a direction in which the touch is applied, among the plurality of projectors.

2. The mobile terminal of claim 1,
wherein when an event is received, the controller displays event information related to the received event together with the first screen information on the touch screen, and
when the touch input is applied to the event information displayed on the touchscreen, the controller projects visual information corresponding to the event information through the projection unit.

3. The mobile terminal of claim 2, wherein the event information is displayed to overlap with the first screen information.

4. The mobile terminal of claim 2, wherein only when the touch input is applied to a region in which the first screen information is displayed, the controller outputs visual information corresponding to the first screen information through the projection unit.

5. The mobile terminal of claim 4, wherein when the touch input is applied to a region in which the event information is displayed, the controller projects the visual information through the projection unit and continuously displays the first screen information on the touch screen.

6. The mobile terminal of claim 1, wherein the controller controls the projection unit such that at least one of a format, a type and a output position in which the visual information corresponding to the first screen information is projected is varied according to a direction in which the touch input is applied.

7. The mobile terminal of claim 6, wherein when the touch input is applied in a first direction, the visual information corresponding to the first screen information is output through the first projector among the plurality of projectors, and when the touch input is applied in a second direction different from the first direction, the visual information corresponding to the first screen information is output through a second projector different from the first projector among the plurality of projectors.

8. The mobile terminal of claim 1, wherein when a pre-set type touch is applied to the visual information corresponding to the first screen information projected through the projection unit, the controller controls the projection unit to finish projecting the visual information corresponding to the first screen information.

9. The mobile terminal of claim 1, wherein the visual information corresponding to the first screen information projected through the projection unit is displayed on a wrist or a back of a hand excluding the region wrapped with the body of the mobile terminal, and the controller controls the projection unit to vary a display size of the visual information corresponding to the first screen information according to an area of the wrist or the back of a hand.

10. A control method of a mobile terminal including a body and a projection unit disposed on the side of the body, the method comprising:

displaying screen information on a touch screen disposed on a front surface of the body;

receiving a touch input applied to the touch screen, in a state in which the first screen information are displayed on the touch screen; and controlling the projection unit to project visual information corresponding to the first screen information currently displayed on the touch screen, on the basis of a pre-set type touch applied to the touch screen, wherein:

the projection unit includes a plurality of projectors, and the visual information corresponding to the first screen information is projected through a projector placed in a position corresponding to a direction in which the touch is applied, among the plurality of projectors.

11. The control method of claim 10, when an event is received, event information related to the received event is displayed together with the first screen information on the touchscreen, and when another touch input is applied on the event information, visual information corresponding to the event information is projected through the projection unit.

* * * * *